United States Patent
Rivera

(10) Patent No.: US 12,004,679 B2
(45) Date of Patent: Jun. 11, 2024

(54) BEVERAGE BREWER WITH MOVING WATER DISPERSION

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 872 days.

(21) Appl. No.: 16/479,242

(22) PCT Filed: Jan. 4, 2017

(86) PCT No.: PCT/US2017/012201
§ 371 (c)(1),
(2) Date: Jul. 19, 2019

(87) PCT Pub. No.: WO2017/120245
PCT Pub. Date: Jul. 13, 2017

(65) Prior Publication Data
US 2020/0000273 A1    Jan. 2, 2020

(51) Int. Cl.
*A47J 31/44* (2006.01)
*A47J 31/10* (2006.01)

(52) U.S. Cl.
CPC ........... *A47J 31/4475* (2013.01); *A47J 31/10* (2013.01)

(58) Field of Classification Search
CPC ...... A47J 31/10; A47J 31/4475; A47J 31/465; A47J 31/4478
USPC .......................................................... 99/279
See application file for complete search history.

(56) References Cited

U.S. PATENT DOCUMENTS

| | | | |
|---|---|---|---|
| 5,301,600 A | 4/1994 | Medema | |
| 5,957,035 A * | 9/1999 | Richter | A23F 5/26 426/433 |
| 7,717,026 B1 | 5/2010 | Lassota | |
| 2003/0150333 A1 | 8/2003 | Fischer | |
| 2003/0213370 A1 * | 11/2003 | Hammad | A47J 31/4478 99/300 |
| 2004/0118299 A1 | 6/2004 | Garman et al. | |
| 2004/0194631 A1 * | 10/2004 | Pope | A47J 31/4478 99/279 |
| 2006/0102012 A1 | 5/2006 | Pope et al. | |
| 2007/0017380 A1 | 1/2007 | Takizawa et al. | |
| 2007/0295216 A1 | 12/2007 | Williamson et al. | |
| 2009/0226585 A1 | 9/2009 | Wroblewski et al. | |
| 2015/0327717 A1 * | 11/2015 | Burrows | A47J 31/3628 99/295 |
| 2017/0000290 A1 | 1/2017 | Van Der Woning et al. | |

(Continued)

FOREIGN PATENT DOCUMENTS

JP      2006280723 A    10/2006
WO      2015101428 A1   7/2015

*Primary Examiner* — Dana Ross
*Assistant Examiner* — Joseph W Iskra
(74) *Attorney, Agent, or Firm* — IP Strategies

(57) ABSTRACT

A coffee maker (10) provides a controlled release of heated water into brewing material (28). In one embodiment the coffee maker (10) includes a spiraling nozzle (74) releasing heated water over the brewing material held (74) in the coffee maker (10). The nozzle (74) provides a single release point at each instant providing improved exposure of the brewing material (28) to the heated water. In another embodiment the coffee maker (10) includes a rotating sprinkler arm (202*a*) releasing heated water into the brewing material (74). In either embodiment motion may be provided by the flow of heated water, or by an electric motor (100).

23 Claims, 20 Drawing Sheets

(56) References Cited

U.S. PATENT DOCUMENTS

2017/0172338 A1 6/2017 Burrows
2017/0347826 A1* 12/2017 Popa .................... A47J 31/469

* cited by examiner

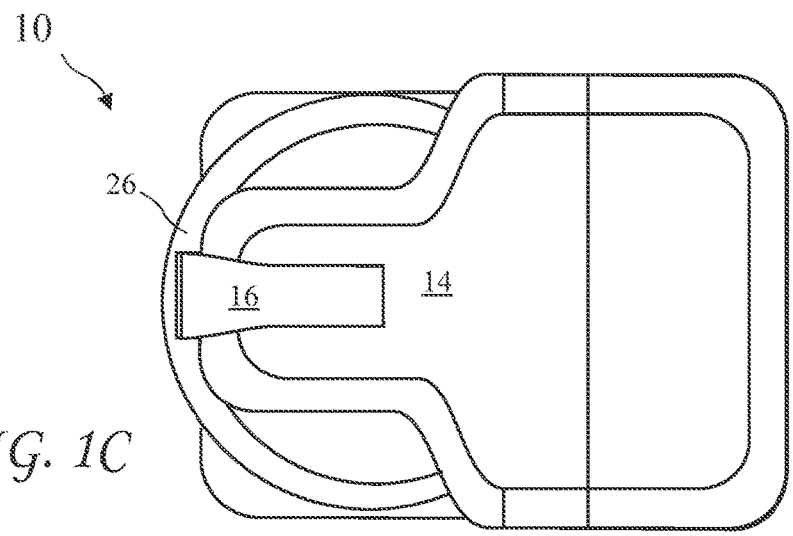
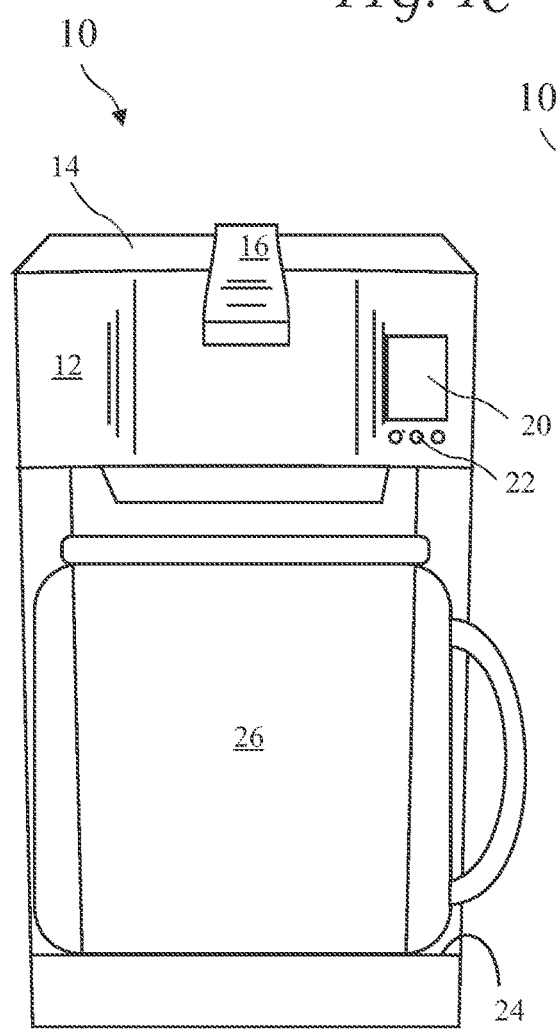
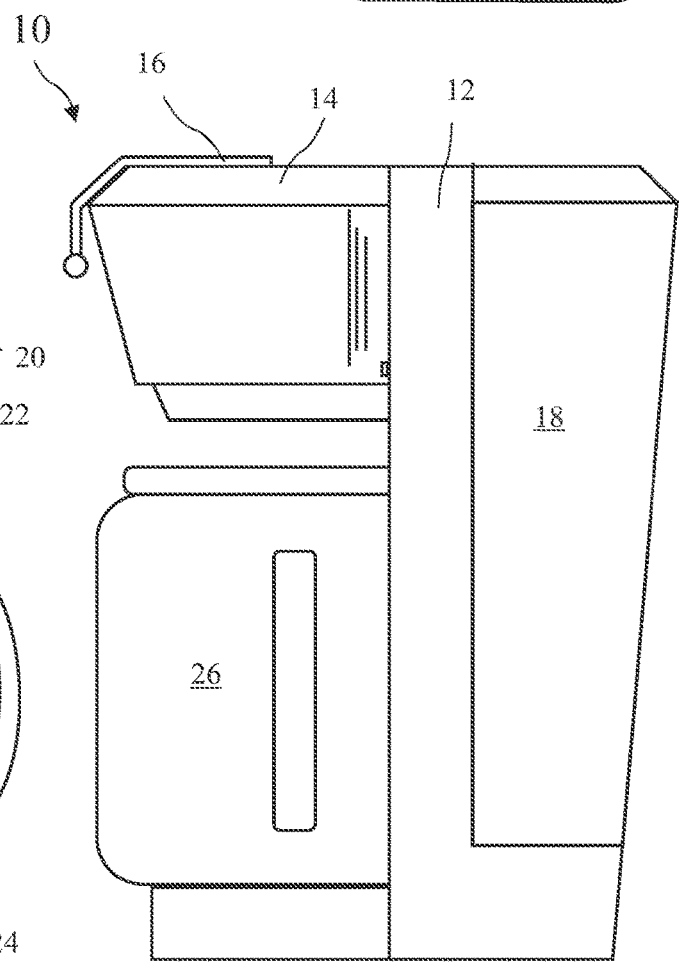
FIG. 1C
FIG. 1A
FIG. 1B

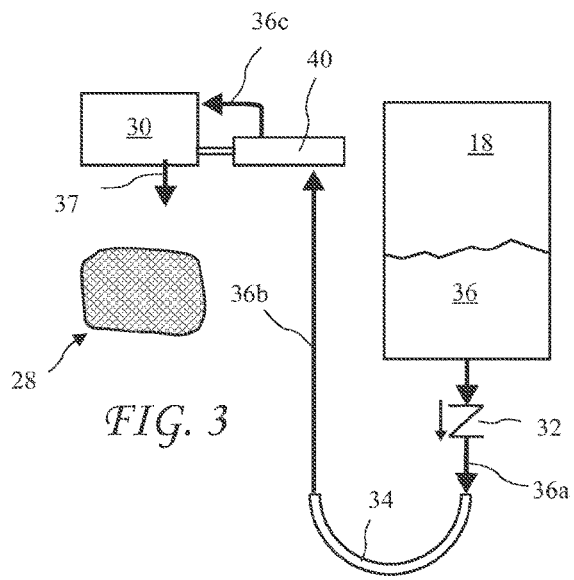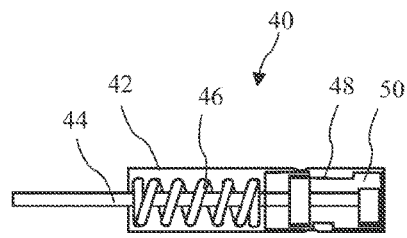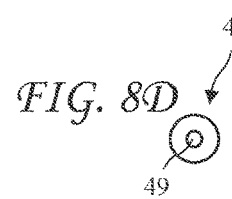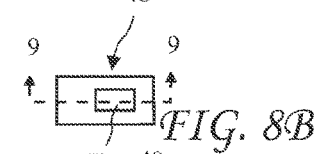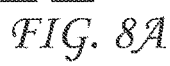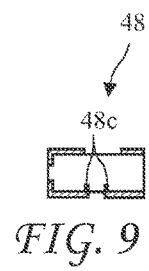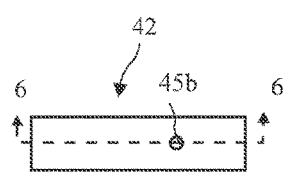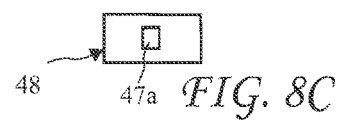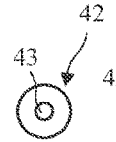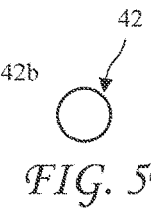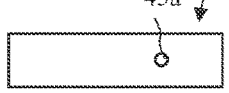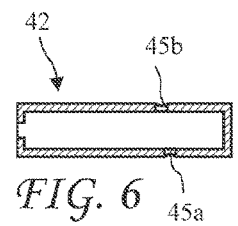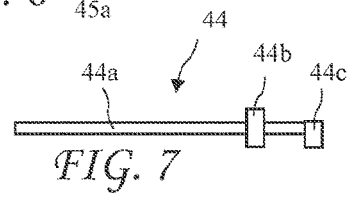

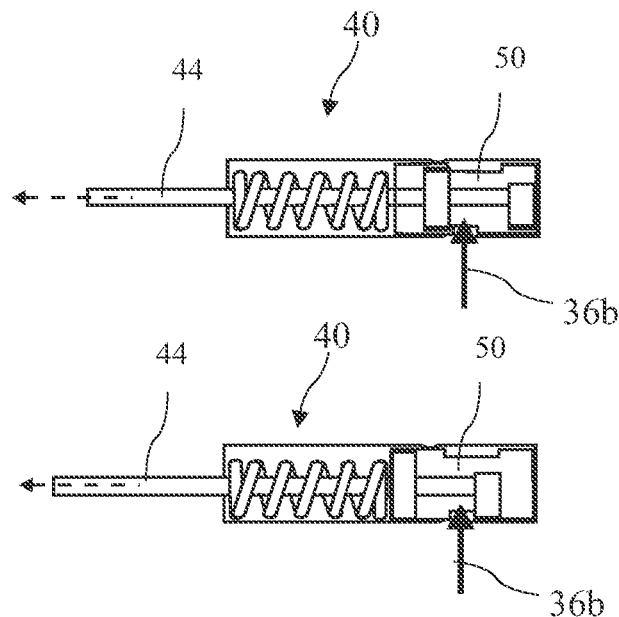
FIG. 10A
FIG. 10B
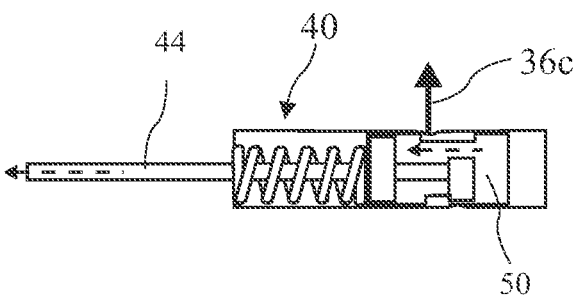
FIG. 10C
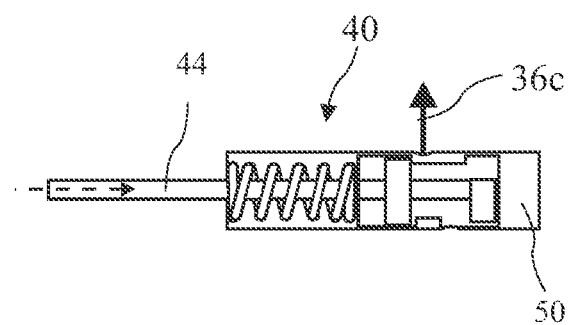
FIG. 10D
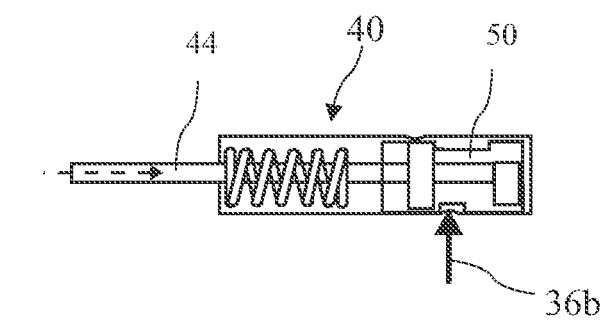
FIG. 10E

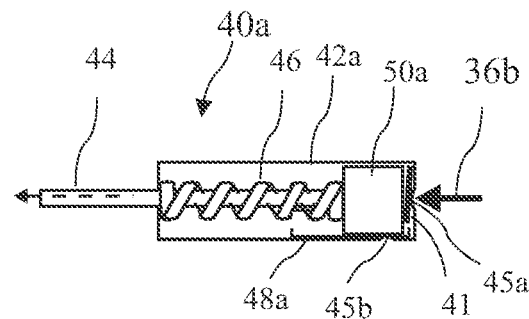
FIG. 11A
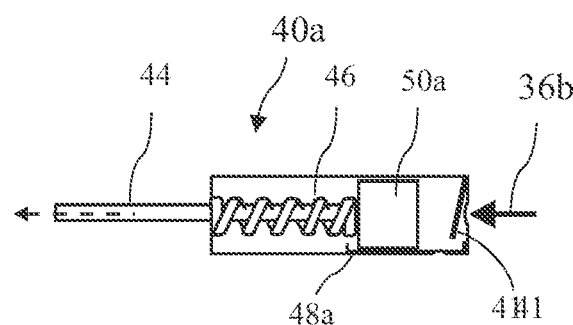
FIG. 11B
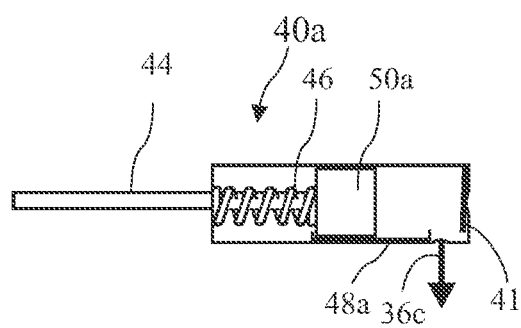
FIG. 11C
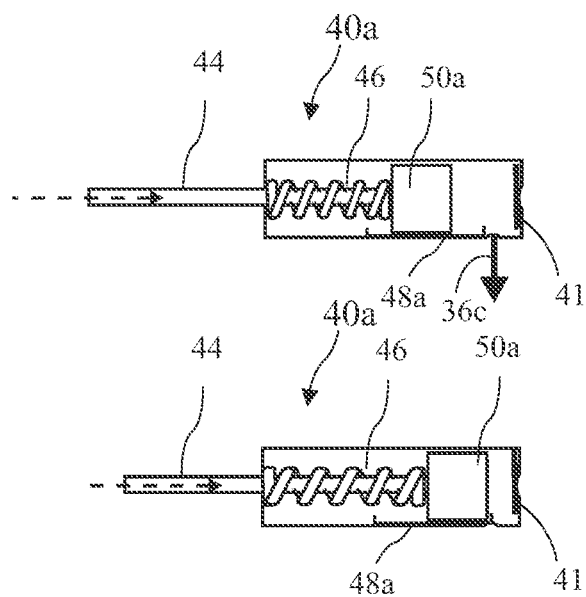
FIG. 11D
FIG. 11E

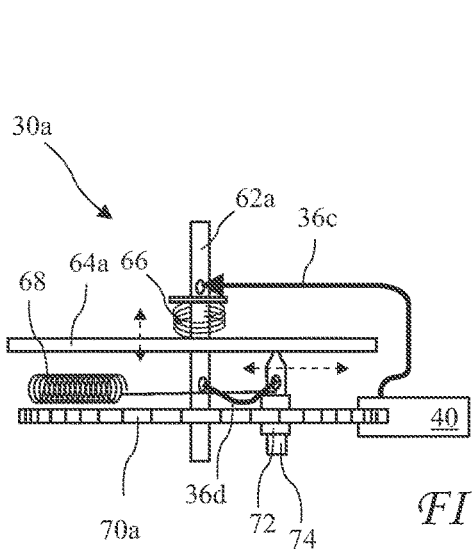
FIG. 12A
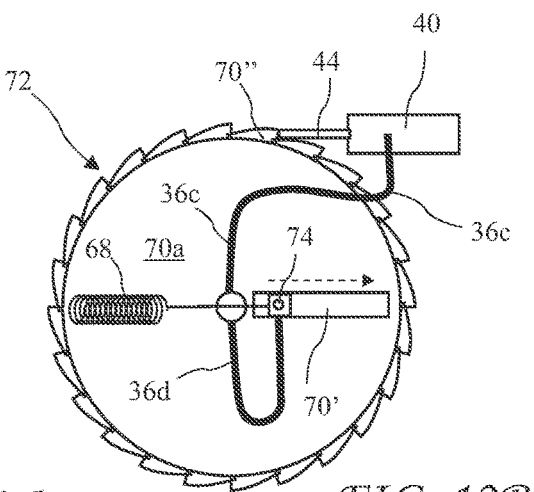
FIG. 12B
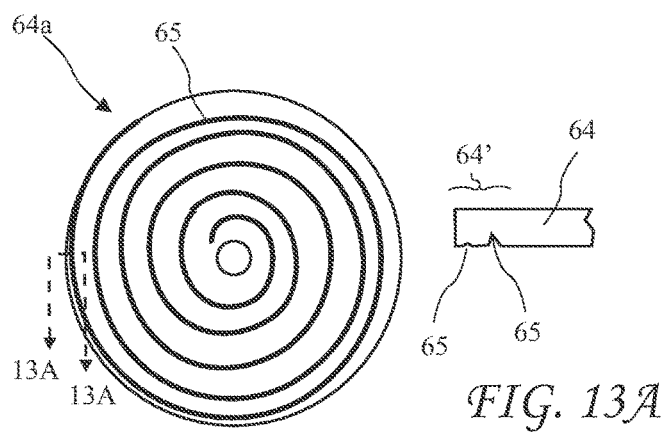
FIG. 13
FIG. 13A
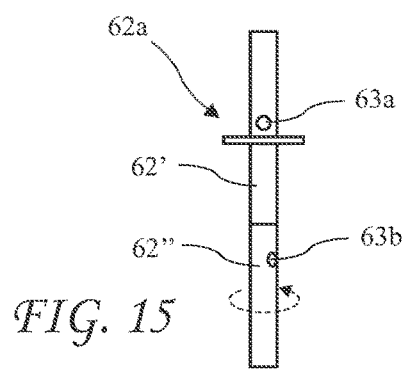
FIG. 15
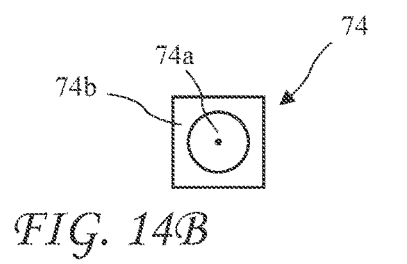
FIG. 14B
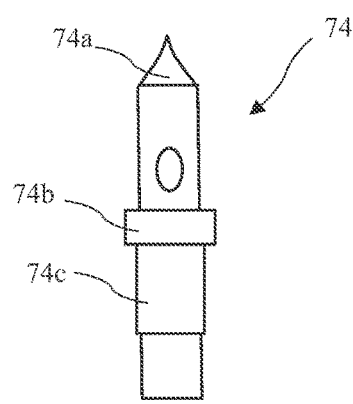
FIG. 14A
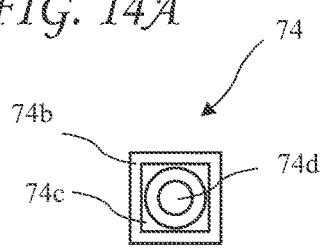
FIG. 14C

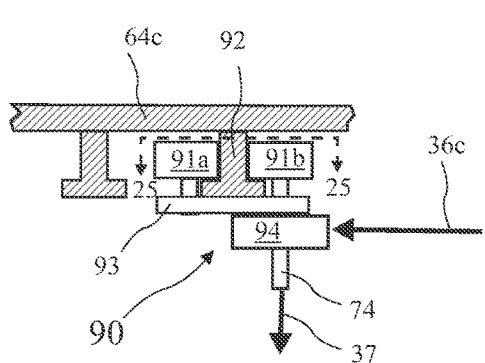
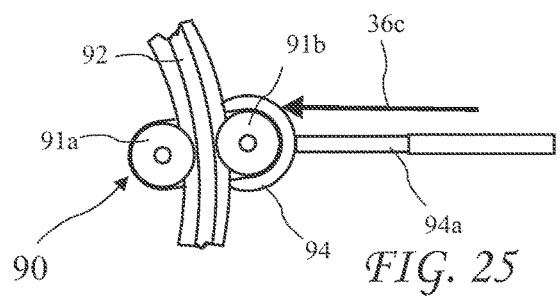
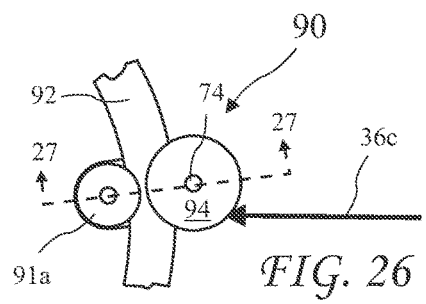
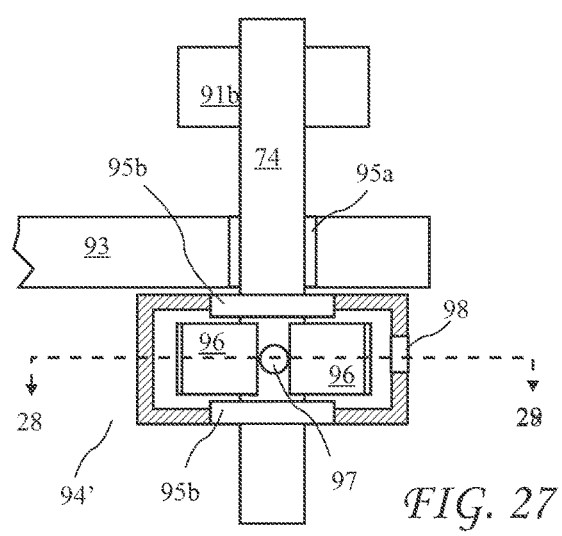
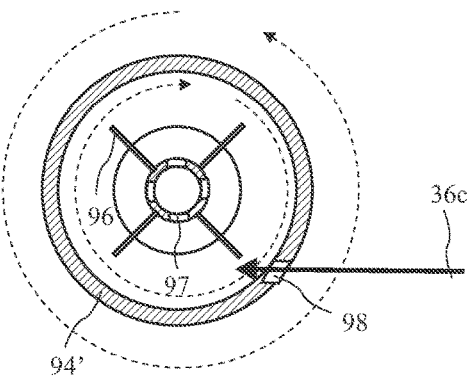
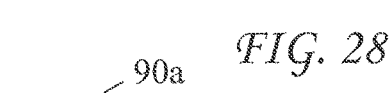
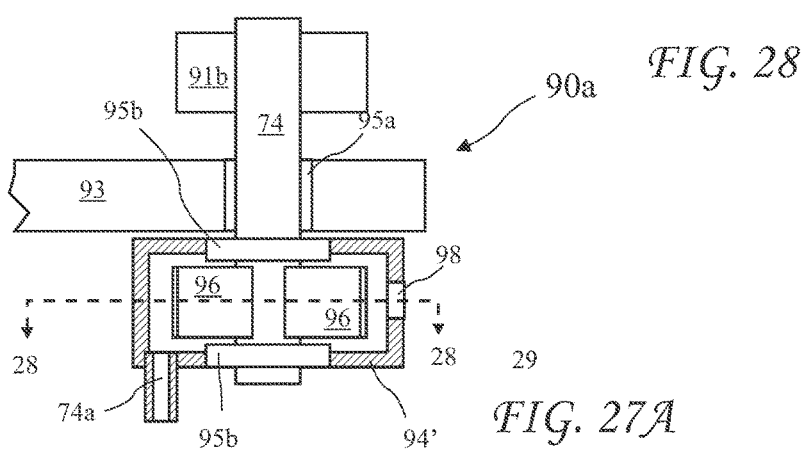

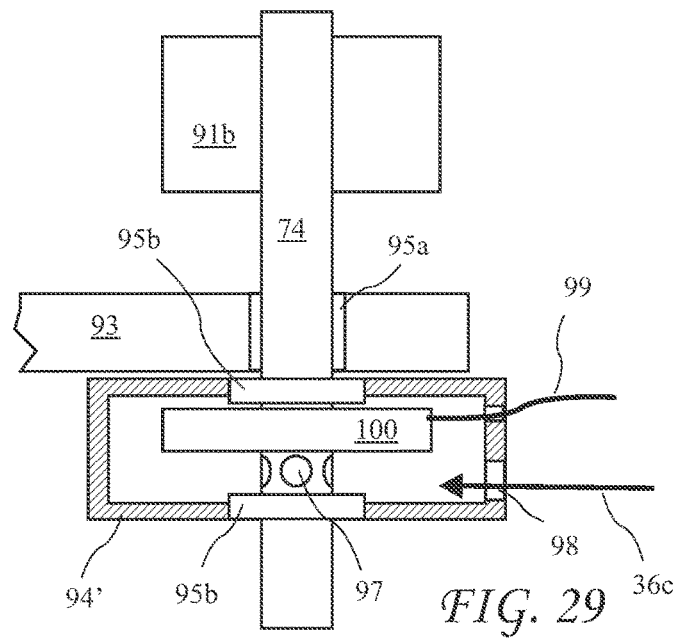
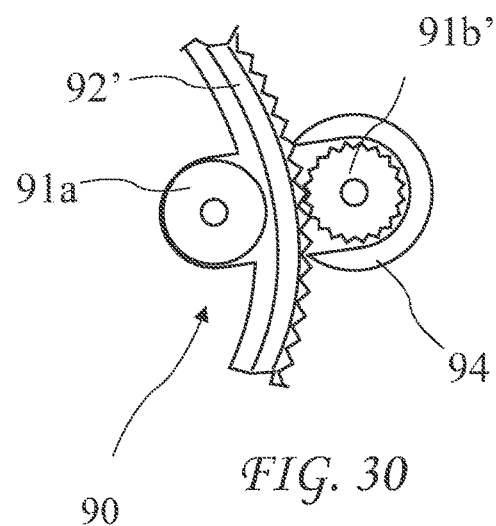
FIG. 29
FIG. 30
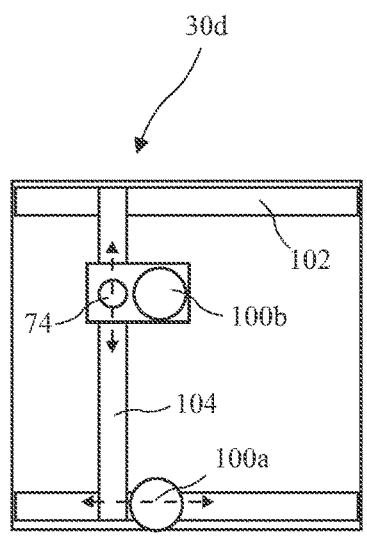
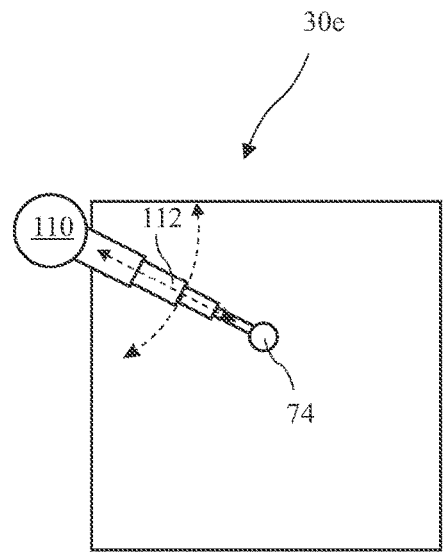
FIG. 31
FIG. 32

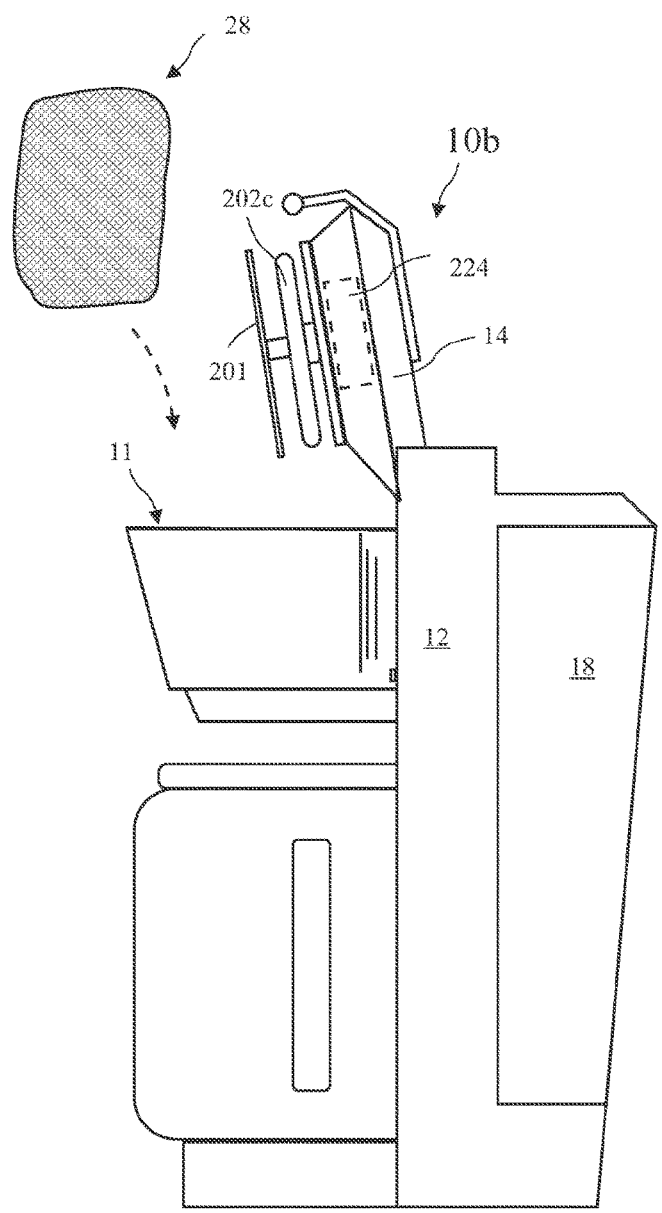
FIG. 47
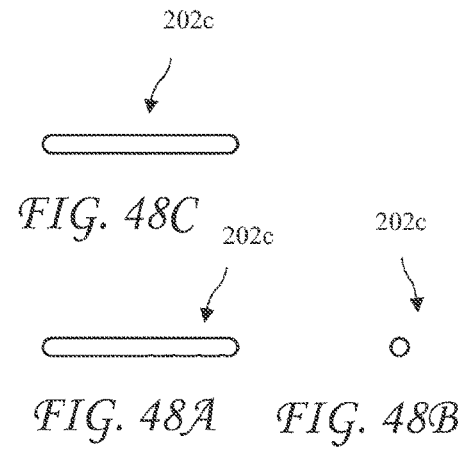
FIG. 48C
FIG. 48A   FIG. 48B
FIG. 48D
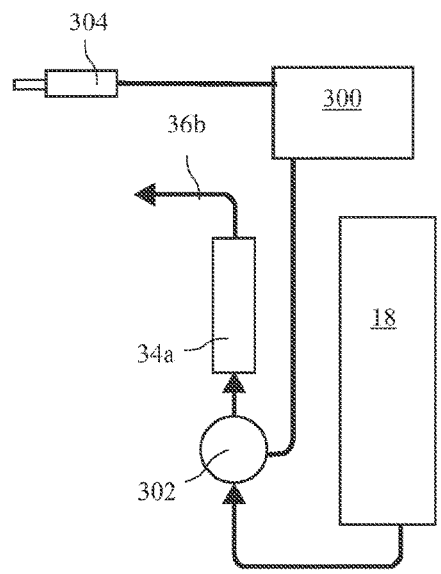
FIG. 49

BEVERAGE BREWER WITH MOVING WATER DISPERSION

CROSS-REFERENCE TO RELATED APPLICATIONS

This is a 371 of International Application No. PCT/US2017/012201, which was filed on Jan. 4, 2017, which in turn claims the priority of U.S. Provisional Patent Application Ser. No. 62/275,122, filed Jan. 5, 2016, and of U.S. patent application Ser. No. 15/231,412, filed Aug. 8, 2016, which applications are incorporated in their entirety herein by reference.

TECHNICAL FIELD

The present invention relates to multi-cup brewers and in particular to disbursing heated water into brewing material.

BACKGROUND ART

Known drip coffee makers include a showerhead above the brewing material having an array of ports releasing heated water into the brewing material. The water is somewhat uniformly released, and not concentrated into any portion of the brewing material at any given time. Because only a minimal flow of water is provided at each location, the water does not significantly impact and agitate the brewing material, and less effective brewing results.

DISCLOSURE OF THE INVENTION

The present invention addresses the above and other needs by providing a coffee maker providing a controlled release of heated water into brewing material. In one embodiment the coffee maker includes a spiraling nozzle releasing heated water over brewing material held in the coffee maker. The nozzle provides a single release point at each instant providing improved exposure of the brewing material to the heated water. In another embodiment the coffee maker includes a rotating sprinkler arm releasing heated water into the brewing material. In either embodiment motion may be provided by the flow of heated water, or by an electric motor.

In accordance with one aspect of the invention, there is provided a drip coffee maker having a water dispersion system driven by a flow of heated water present in the coffee maker. The flow of water cycles a piston and push rod to rotate a nozzle disk to provide a pattern of a concentrated release of water over the brewing material.

In accordance with another aspect of the invention, there is provided a drip coffee maker having a water dispersion system including a nozzle rotating with the nozzle disk and moving radially to provide a pattern of a concentrated release of water over the brewing material.

In accordance with yet another aspect of the invention, there is provided a drip coffee maker having a water dispersion system including a nozzle carried by a pivoting arm and moving radially to release a flow of water onto the rotating nozzle disk to provide a pattern of a concentrated release of water over the brewing material.

In accordance with still another aspect of the invention, there is provided a drip coffee maker having a water dispersion system including a spiral guide causing radial motion of the nozzle to provide a pattern of a concentrated release of water over the brewing material.

In accordance with yet another aspect of the invention, there is provided a drip coffee maker having a rotating arm releasing the heated water into the brewing material. The arm may include angled ports providing a spray to rotate the arm, or be motor driven and include straight ports.

In accordance with another aspect of the invention, there is provided a drip coffee maker having a water dispersion system including a motor to rotate the nozzle disk or the arm.

BRIEF DESCRIPTION OF THE DRAWING

The above and other aspects, features and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 3 shows elements of a drip coffee maker and dispersion system according to the present invention.

FIG. 4 shows a cross-sectional view of a piston assembly according to the present invention.

FIG. 5A shows a side view of a cylinder of the piston assembly according to the present invention.

FIG. 5B shows a top view of the cylinder of the piston assembly according to the present invention.

FIG. 5C shows a bottom view of the cylinder of the piston assembly according to the present invention.

FIG. 5D shows a front view of the cylinder of the piston assembly according to the present invention.

FIG. 5E shows a rear view of the cylinder of the piston assembly according to the present invention.

FIG. 6 shows a cross-sectional view of the cylinder of the piston assembly according to the present invention taken along line 6-6 of FIG. 5B.

FIG. 7 shows a side view of a piston and rod of the piston assembly according to the present invention.

FIG. 8A shows a side view of a sleeve of the piston assembly according to the present invention.

FIG. 8B shows a top view of the sleeve of the piston assembly according to the present invention.

FIG. 8C shows a bottom view of the sleeve of the piston assembly according to the present invention.

FIG. 8D shows a front view of the sleeve of the piston assembly according to the present invention.

FIG. 8E shows a rear view of the sleeve of the piston assembly according to the present invention.

FIG. 9 shows a cross-sectional view of the sleeve of the piston assembly according to the present invention taken along line 9-9 of FIG. 8B.

FIG. 10A shows a cross-sectional view of the piston assembly with the piston and rod to the right, according to the present invention.

FIG. 10B shows a cross-sectional view of the piston assembly partially filed and with the piston and rod moving partially to the left, according to the present invention.

FIG. 10C shows a cross-sectional view of the piston assembly completely filed and with the piston and rod to the left, according to the present invention.

FIG. 10D shows a cross-sectional view of the piston assembly partially filed and with the piston and rod moving partially to the right, according to the present invention.

FIG. 10E shows a cross-sectional view of the piston assembly with the piston and rod back to the right, according to the present invention.

FIG. 11A shows a cross-sectional view of a second piston assembly with the piston and rod to the right, according to the present invention.

FIG. 11B shows a cross-sectional view of the second piston assembly partially filed and with the piston and rod moving partially to the left, according to the present invention.

FIG. 11C shows a cross-sectional view of the second piston assembly completely filed and with the piston and rod farther to the left, according to the present invention.

FIG. 11D shows a cross-sectional view of the second piston assembly partially filed and with the piston and rod moving back to the right, according to the present invention.

FIG. 11E shows a cross-sectional view of the second piston assembly with the piston and rod back to the right, according to the present invention.

FIG. 12A shows a side view of a first water dispersion assembly according to the present invention.

FIG. 12B is a top view of a first distribution disk of the first water dispersion assembly according to the present invention.

FIG. 13 shows a bottom view of a spiral guide of the first water dispersion assembly according to the present invention.

FIG. 13A shows a partial cross-sectional view an outer edge of the spiral guide according to the present invention.

FIG. 14A is a side view of a nozzle of the first water dispersion assembly according to the present invention.

FIG. 14B is a top view of the nozzle of the first water dispersion assembly according to the present invention.

FIG. 14C is a bottom view of the nozzle of the first water dispersion assembly according to the present invention.

FIG. 15 is a spindle of the first water dispersion assembly according to the present invention.

FIG. 24 shows a side view of a carrier of the third water dispersion assembly according to the present invention.

FIG. 25 shows a top view of the carrier of the third water dispersion assembly according to the present invention taken along line 25-25 of FIG. 24.

FIG. 26 shows a bottom view of the carrier of the third water dispersion assembly according to the present invention.

FIG. 27 shows a cross-sectional view of a water powered carrier of the third water dispersion assembly according to the present invention taken along line 27-27 of FIG. 26.

FIG. 27A shows a cross-sectional view of a water powered carrier of the third water dispersion assembly according to the present invention taken along line 27-27 of FIG. 26 having an offset nozzle.

FIG. 28 shows a cross-sectional view of the carrier of the third water dispersion assembly according to the present invention taken along line 28-28 of FIG. 27.

FIG. 29 shows a cross-sectional view of an electric powered carrier of the third water dispersion assembly according to the present invention taken along line 27-27 of FIG. 26.

FIG. 30 shows a drive roller and rail having engaging teeth according to the present invention.

FIG. 31 shows a fourth third water dispersion assembly including an X-Y positioned nozzle according to the present invention.

FIG. 32 shows a fifth water dispersion assembly including an R theta positioned nozzle according to the present invention.

FIG. 47 shows a third coffee maker according to the present invention.

FIG. 48A shows a side view of third water dispersing arms according to the present invention.

FIG. 48B shows a side view of third water dispersing arms according to the present invention.

FIG. 48C shows a side view of third water dispersing arms according to the present invention.

FIG. 48D shows a side view of third water dispersing arms according to the present invention.

FIG. 49 shows components of a non-drip coffee maker according to the present invention.

Corresponding reference characters indicate corresponding components throughout the several views of the drawings.

BEST MODE FOR CARRYING OUT THE INVENTION

Figure 2:
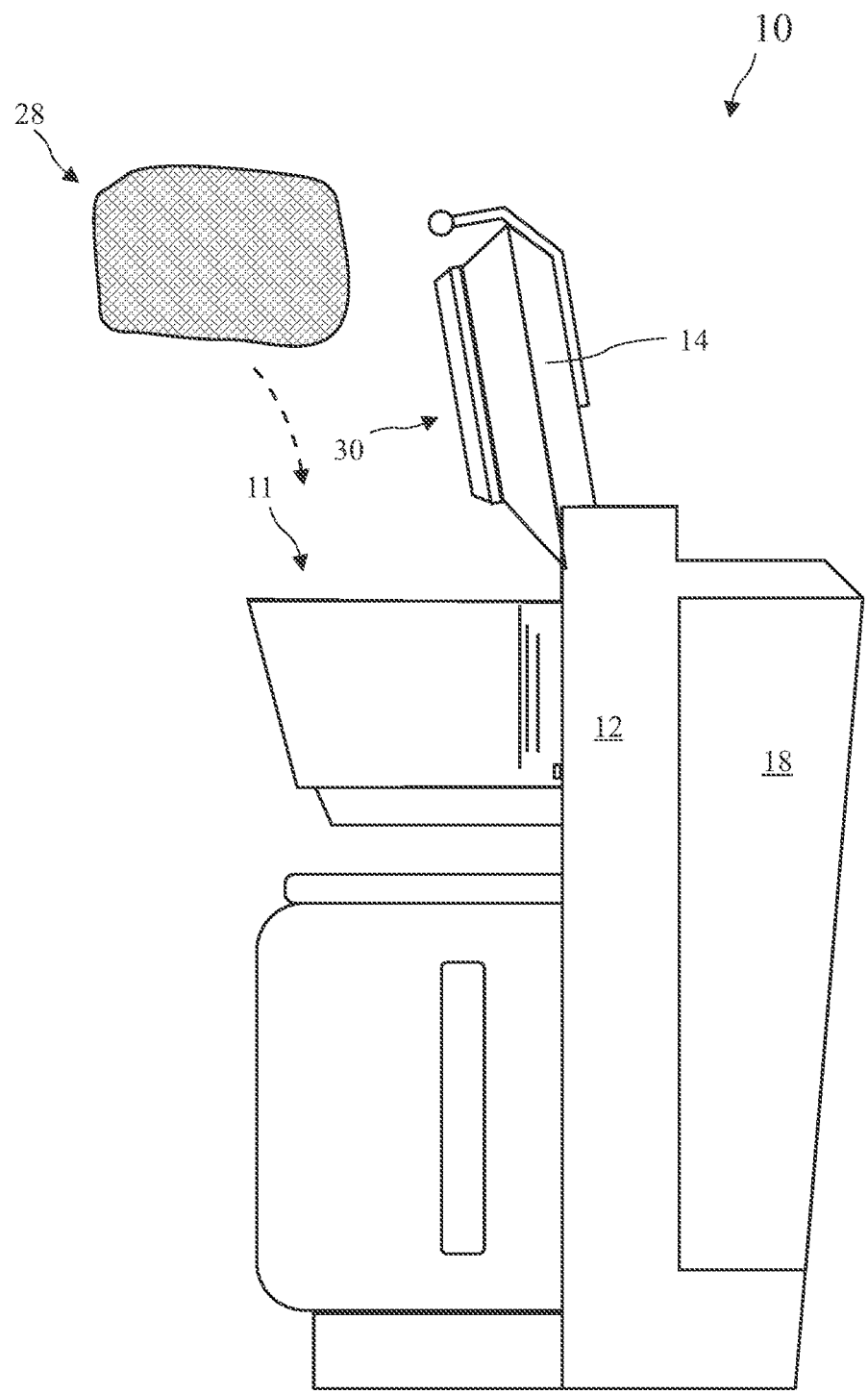
FIG. 2 is a side view of the coffee maker with an open lid allowing placement of a coffee holder according to the present invention inside the coffee maker.
Figure 16A:
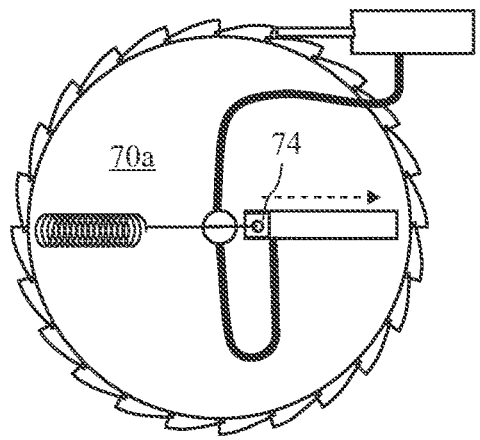
FIGS. 16A-16F show six sequential positions of the nozzle of the first water dispersion assembly according to the present invention.
Figure 16B:
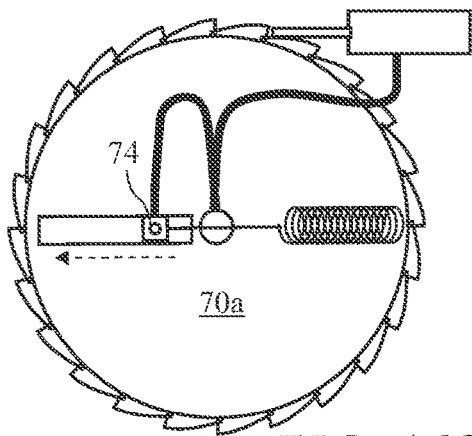
Figure 16C:
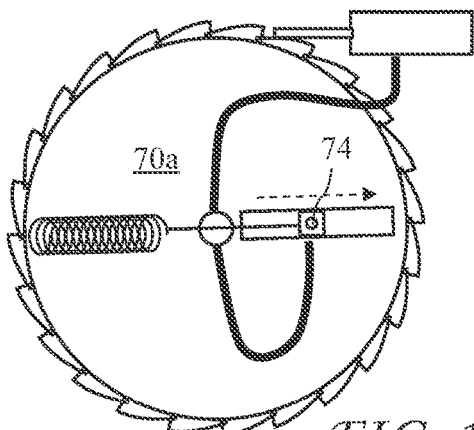
Figure 16D:
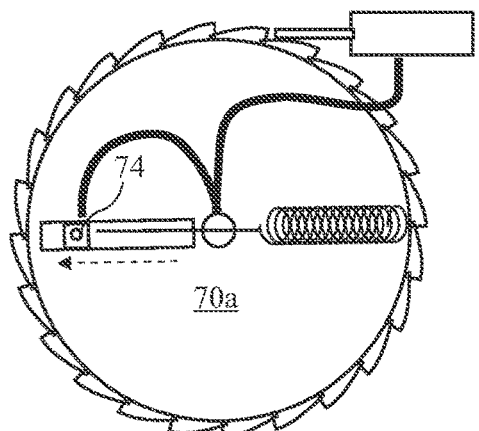
Figure 16E:
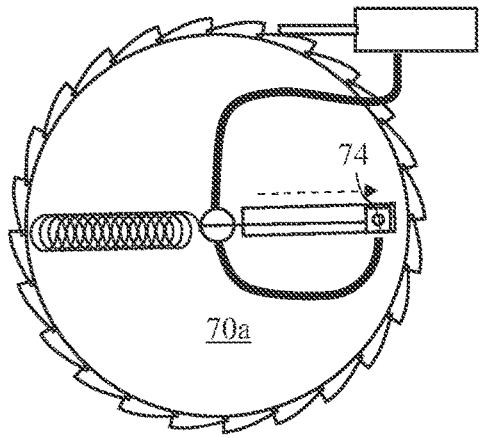
Figure 16F:
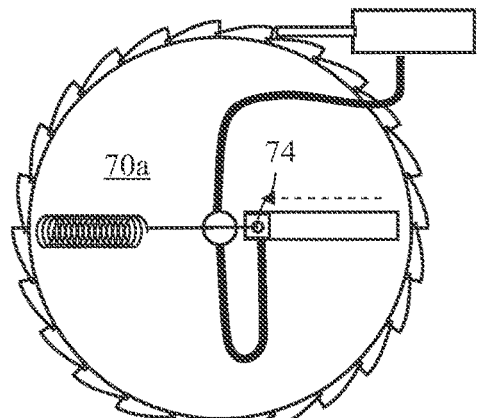

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

A front view of a coffee maker 10 according to the present invention is shown in FIG. 1A a side view of the coffee maker 10 is shown in FIG. 1B, and a top view of the coffee maker 10 is shown in FIG. 1C. The coffee maker 10 includes a body 12, a coffee maker lid 14, a lid handle 16, a water container 18, a display 20, controls 22, and a platform 24. A coffee pitcher 26 rests on the platform 24. The coffee maker 10 provides a flow of hot water through brewing material to produce a brewed drink. The flow of water may be heated by one of any known means, for example, an electrical heating coil, a conductive coating on tubing carrying the water, or inductive heating.

A side view of the coffee maker 10 with the lid 14 open allowing placement of brewing material inside a brewing chamber 11 of the coffee maker 10 is shown in FIG. 2. A water dispersion assembly 30 resides on the bottom of the lid 14 and provides a flow of heated water 37 (see FIG. 3) into the brewing material 28.

Elements of a drip coffee maker and the dispersion assembly 30 are shown in FIG. 3. The drip coffee maker includes the water container 18 holding water 36, a check valve 32 controlling a flow of water 36a from the container 18, a heating element 34 heating the flow of water 36a to create a pulsating heated flow of water 36b, a piston assembly 40 receiving the heated flow of water 36b and releasing a second flow of heated water 36c, and the water dispersion assembly 30 receives the second flow of heated water 36c and provides a directed flow of heated water to the brewing material 28.

A cross-sectional view of the piston assembly 40 is shown in FIG. 4. The piston assembly 40 includes a cylinder 42, a piston and rod 44 sliding in the cylinder 42, a spring 46 biasing the piston and rod 44 to the right, a sleeve valve 48 sliding to the left and right between the piston and rod 44 and the cylinder 42, and a volume 40 to the right of the piston and rod 44. The volume 50 grows as the piston and rod 44 move left, and shrinks as the piston and rod 44 move to the right. The rod 44 is preferably a reciprocating rod engaging an off-center feature of the water dispensing assembly 30 to rotate at least part of the water dispensing assembly (see FIG. 12B).

A side view of the cylinder 42 of the piston assembly 40 is shown in FIG. 5A, a top view of the cylinder 42 is shown in FIG. 5B, a bottom view of the cylinder 42 is shown in FIG. 5C, a front view of the cylinder 42 is shown in FIG. 5D, a rear view of the cylinder 42 is shown in FIG. 5E, and a cross-sectional view of the cylinder 42 taken along line 6-6 of FIG. 5B is shown in FIG. 6. The cylinder 42 has a mostly closed front 42 with a passage 43 for the piston and rod 44, which may include a seal, and has a closed rear 42b. An inlet port 45a receives the flow of heated water 36b, and an exit port 45b releases the second flow of heated water 36c.

A side view of a piston and rod 44 of the piston assembly 40 is shown in FIG. 7. The piston and rod 44 includes a rod portion 44a, a piston portion 44b, and a sleeve engaging portion 44c.

A side view of the sleeve valve 48 of the piston assembly 40 is shown in FIG. 8A, a top view of the sleeve valve 48 is shown in FIG. 8B, a bottom view of the sleeve valve 48 is shown in FIG. 8C, a front view of the sleeve valve 48 is shown in FIG. 8D, a rear view of the sleeve valve 48 is shown in FIG. 8E, and a cross-sectional view of the sleeve valve 48 taken along line 9-9 of FIG. 8B is shown in FIG.

9. The sleeve valve 48 includes a mostly closed front 48a having a passage 49 for the rod portion 44a of the piston and rod 44, an open rear 48b, and intrusions 48c for cooperation with the piston portion 44b and the sleeve engaging portion 44c of the piston and rod 44. An inlet window 47a aligns with the inlet port 45a to allow entry of the flow of heated water 36b into the piston assembly 40, and an outlet window aligns with the outlet port 45b to release the second flow of heated water 36c from the piston assembly 40.

A cross-sectional view of the piston assembly 40 with the piston and rod 44 to the right is shown in FIG. 10A, a cross-sectional view of the piston assembly 40 partially filed and with the piston and rod 44 moving partially to the left is shown in FIG. 10B, a cross-sectional view of the piston assembly 40 completely filed and with the piston and rod 44 to the left is shown in FIG. 10C, a cross-sectional view of the piston assembly 40 partially filed and with the piston and rod 44 moving partially to the right is shown in FIG. 10D, and a cross-sectional view of the piston assembly 40 with the piston and rod 44 back to the right is shown in FIG. 10E. When the piston and rod 44 are fully to the right, the inlet port 45a is aligned with the inlet window 47a, and the flow of heated water 36b enters the interior 50 of the piston assembly 40, pushing the piston and rod 42 to the left.

When the piston and rod 42 move sufficiently to the left, the sleeve engaging portion 44c contacts the intrusions 48c and further movement of the piston and rod 42 to the left pushes the sleeve valve 48 to the left, dis-aligning the inlet port 45a from the inlet window 47a and aligning the outlet port 45b with the outlet window 47b halting the flow of heated water 36b into the piston assembly 40 and initiating the second flow of heated water 36c from the piston assembly 40. The spring 46 then pushes the piston and rod 44 back to the right while the second flow of heated water 36c continues to be released from the piston assembly 40. At the end of the rightward motion of the piston and rod 42, the piston portion 44b engages the intrusions 48c to push the sleeve valve 48 back to the right to realign the inlet port 45a from the inlet window 45a and dis-aligning the outlet port 45b with the outlet window 47b to reinitiate the flow of heated water 36b into the piston assembly, and the cycle repeats.

A cross-sectional view of a second simpler but potentially less effective piston assembly 40a with the piston 50a and rod 44 to the right is shown in FIG. 11A. The second flow of heated water 36b is entering the cylinder 42a through inlet ports 45a in the right end of the cylinder 42a driving the piston 50a and rod 44 to the left compressing the spring 46. A flap valve 41 allows the flow 36b into the cylinder 42a and a sliding valve 48a blocks the flow 36c from the cylinder 42.

A cross-sectional view of the second piston assembly 40a partially filed and with the piston and rod moving partially to the left is shown in FIG. 11B. The cylinder is filling with the second flow of heated water 36b through inlet port 45a continuing to drive the piston 50a and rod 44 to the left. The flap valve 41 continues to allow the flow 36b into the cylinder 42a and the sliding valve 48a continues to block the flow 36c from the cylinder 42a.

A cross-sectional view of the second piston assembly 40a with the piston 50a and rod 44 farther to the left is shown in FIG. 11C. The second flow of heated water 36b continues to enter the cylinder 42a through the inlet port 45a, and outlet port 45b is now uncovered and the third flow of heated water 36c is releasing through the outlet port 45b. The flap valve 41 blocks the inlet port 45a and the piston 50a has moved the sliding valve 48a to allow the flow 36c from the cylinder 42a.

A cross-sectional view of the second piston assembly 40a with the piston 50a and rod 44 urged to the right by the spring 46 is shown in FIG. 11D. The flap valve 41 continues to block the inlet port 45a and the sliding valve 48a continues to allow the flow 36c from the cylinder 42a.

A cross-sectional view of the second piston assembly 40a with the piston 50a and rod 44 traveling back to the right is shown in FIG. 11E. The flap valve 41 continues to block the inlet port 45a and the piston 50a is moving the sliding valve 48a blocking the flow 36c from the cylinder 42a.

A side view of a first water dispersion assembly 30a is shown in FIG. 12A and top view of a rotating first distribution disk 70a of the first water dispersion assembly 30a is shown in FIG. 12B. The water dispersion assembly 30a includes the piston assembly 40, a distribution disk assembly 72, a spindle 62a, and a spiral guide 64a (see FIG. 13), a spring 66 pressing down on the spiral guide 64a. The third flow of heated water 36c is carried from the piston assembly 40 a non-rotating portion 62a (see FIG. 15) of the spindle 62. The distribution disk assembly 72 rotates with a rotating portion 62" of the spindle 62a and a nozzle 74 slides radially in a slot 70' in the distribution disk 70a. A spring 68 pulls the nozzle 74 towards the center of the distribution disk 70a. The nozzle 74 further engages the spiral guide 64a to slide the nozzle 62 radially outward along slot 70' as the distribution disk 70a rotates. The rod 44 of the piston assembly 40 provides rotation of the distribution disk 70a by pushing against teeth 70" on the perimeter of the distribution disk 70a. A fourth flow of heated water 36d runs from the spindle 62a to the nozzle 74.

A bottom view of the spiral guide 64a is shown in FIG. 13 and a cross-sectional view of an edge portion 64' of the spiral guide 64a is shown in FIG. 13A. The spiral 65 is an indentation (or groove) in the bottom of the spiral guide 64a and the groove 65 grows shallow at the edge portion 64' of the spiral guide 64a. When the nozzle 74 reached the edge portion 64', the spiral guide rises, and the nozzle 74 is released and skips across the grooves 65 the nozzle 74 to an initial location proximal to the center of the distribution disk 70a and starts moving out again, thus providing a concentrated distributed flow of heated water into the brewing material 28. While a spiral guide 64a is shown biased towards the distribution disk 70a, in other embodiments the spiral guide may be fixed, and the nozzle 74 may be biased towards the spiral guide 64a.

A side view of the nozzle 74 is shown in FIG. 14A, a top view of the nozzle 74 is shown in FIG. 14B, and a bottom view of the nozzle 74 is shown in FIG. 14C. The nozzle 74 includes a spiral engaging tip 74a which may be pointed, offset, rounded, or any shape suitable to cooperate with a groove 65 and to skip across the spiral guide 64a after disengaging from the groove 65. A stop portion 74b resides above a guide portion 74c which slides in the slot 70'. The heated flow of water 36 is released through a port 74d in the bottom of the nozzle 74.

The spindle 62a including a fixed portion 62' and a rotating portion 62" is shown in FIG. 15. The rotating portion 62" rotates with the distribution disk 70a. The fourth flow of heated water 36d enters the spindle 62a through stationary port 63a and is released from the spindle 62" through rotating port 63b.

Six sequential positions of the nozzle 74 of the first water dispersion assembly 30a are shown in FIGS. 16A-16F. As the distribution disk 70a rotates, the nozzle 74 moves out radially through cooperation with a second spiral guide 64a. When the nozzle 74 reaches the end of the slot 70', the nozzle 74 disengages from the spiral guide 64a and returns to its initial location proximal to the spindle 62a.

Figure 17A:
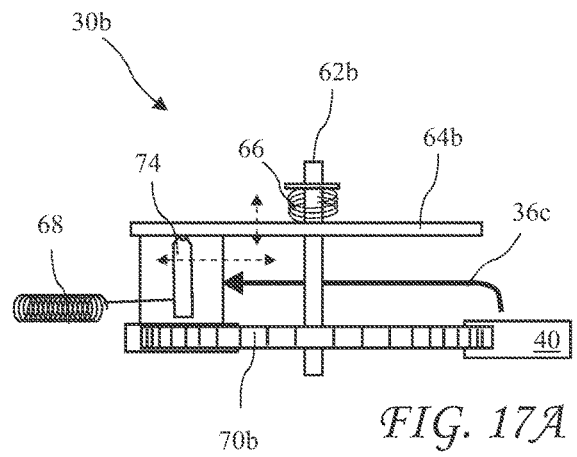
FIG. 17A shows a side view of a second water dispersion assembly according to the present invention.
Figure 17B:
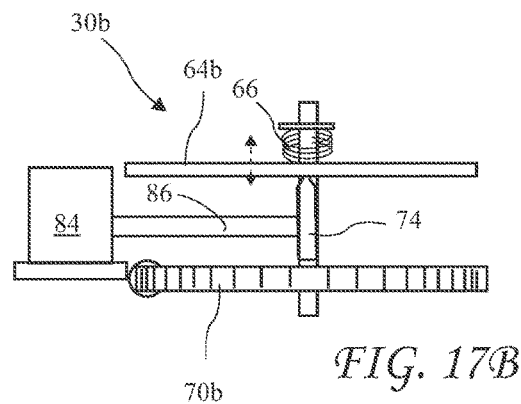
FIG. 17B shows a second side view of a second water dispersion assembly according to the present invention.
Figure 18:
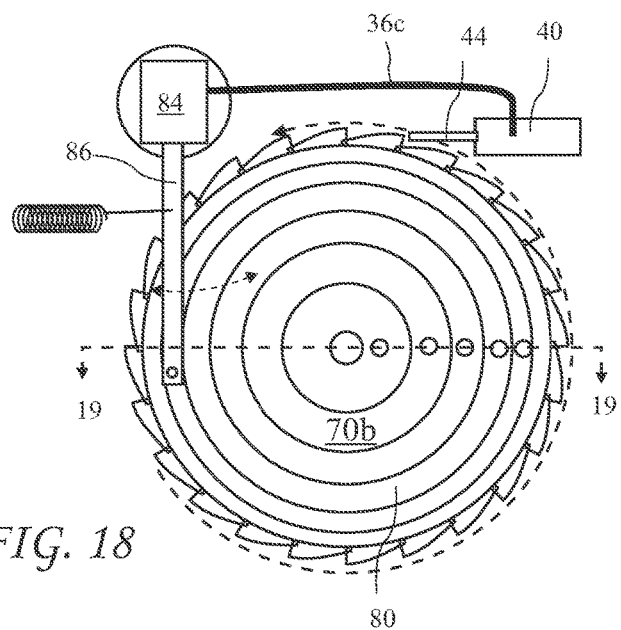
FIG. 18 is a top view of a second distribution disk of the second water dispersion assembly according to the present invention.

A side view of a second water dispersion assembly 30b is shown in FIG. 17A, a second side view of the second water dispersion assembly 30b is shown in FIG. 17B, and a top view of a second distribution disk 70b of the second water dispersion assembly 30b is shown in FIG. 18. The water dispersion assembly 30b includes an arm 86 extending from a pivot block 84. A spring 68 pulls the arm 86 outward, and a rotating second spiral guide 64b guides the arm 86 inward. The spiral guide 64b is very similar to the spiral guide 64a, except the inner most spiral of the spiral guide 64b reduces in depth to disengage the nozzle 74 from the spiral guide 64b to allow the spring 68 to pull the arm 86 outward, the nozzle 74 skipping over grooves 65, to return to an outside position to repeat the inward travel of the nozzle 74.

Figure 19:
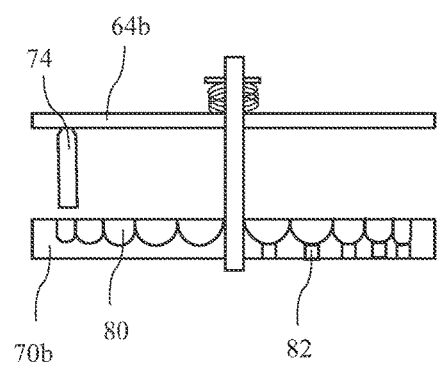
FIG. 19 is a cross-sectional view of the second distribution disk of the second water dispersion assembly according to the present invention taken along line 19-19 of FIG. 18.
Figure 20A:
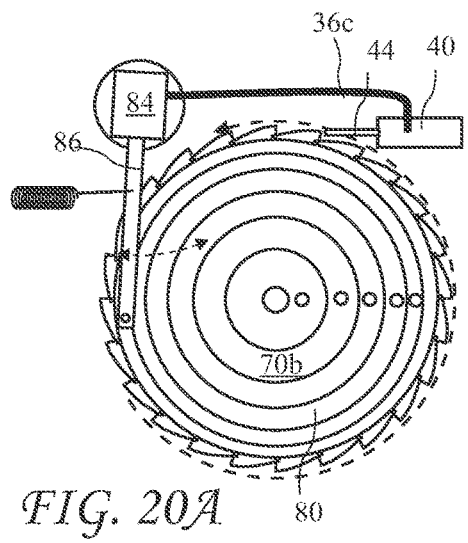
FIGS. 20A-20F show six sequential positions of the nozzle of the second water dispersion assembly according to the present invention.
Figure 20B:
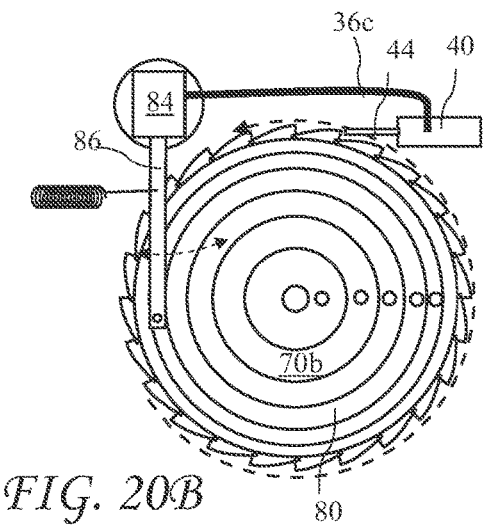
Figure 20C:
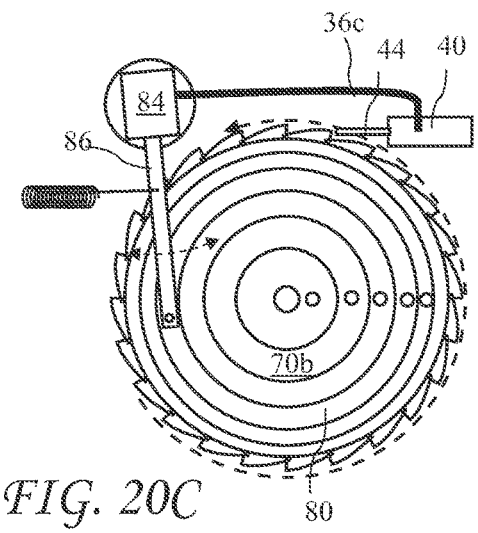
Figure 20D:
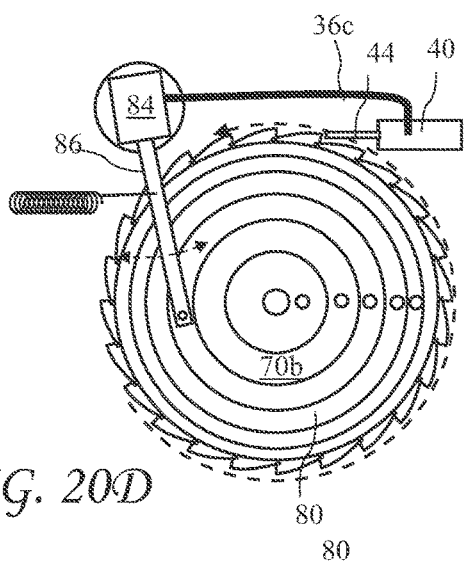
Figure 20E:
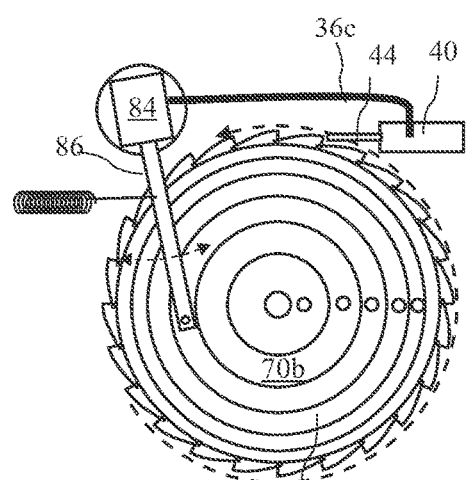
Figure 20F:
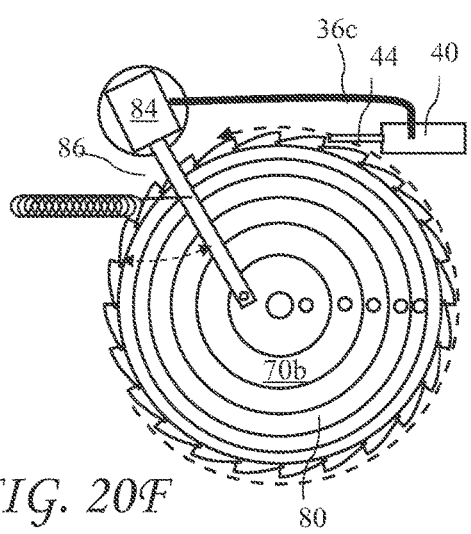

A cross-sectional view of the distribution disk 70b taken along line 19-19 of FIG. 18, is shown in FIG. 19. The distribution disk 70b includes concentric troughs 80 having passages 82 to release heated water from the distribution disk 70b into the brewing material 28. Each trough 80 is consecutively filled with heated water as the arm 86 pivots inward. The heated water is distributed angularly by rotation of the distribution disk 70b caused by the piston assembly 40.

Six sequential positions of the nozzle of the water dispersion assembly 30b are shown in FIGS. 20A-20F. As the arm 86 is caused to pivot by the spiral guide 64b, the nozzle 74 sequentially fills the troughs, from the outermost trough, to the inner most trough, and then repeats.

Figure 21:
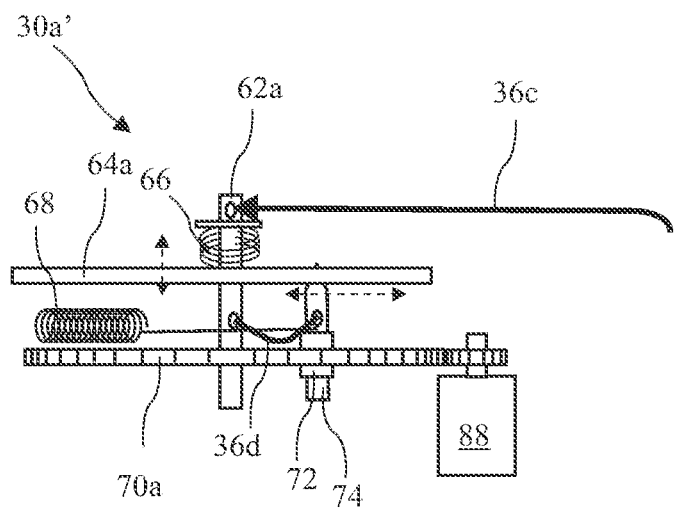
FIG. 21 shows an embodiment of the first dispersion assembly with rotation provided by a motor, according to the present invention.
Figure 22:
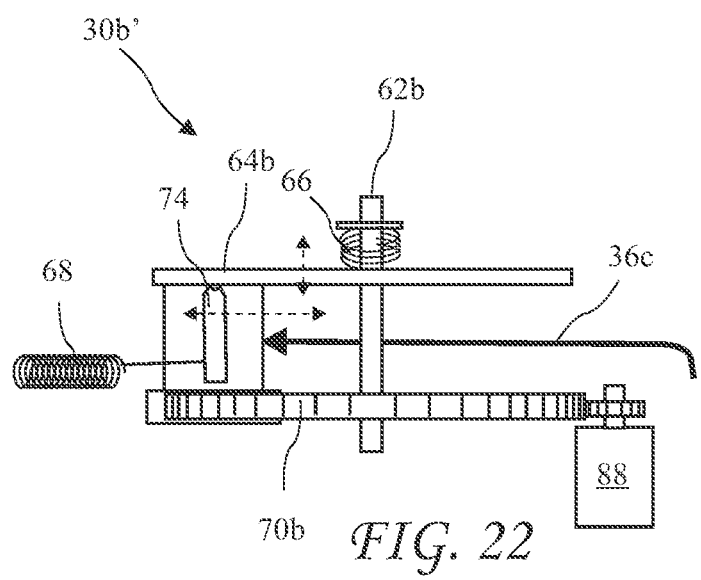
FIG. 22 shows an embodiment of the second dispersion assembly with rotation provided by a motor, according to the present invention.

An embodiment of the first dispersion assembly 30a' with rotation provided by a motor 88 is shown in FIG. 21, and an embodiment of the second dispersion assembly 30b' with rotation provided by the motor 88 is shown in FIG. 22. The motor 88 replaces the piston assembly 40, and the flow of heated water may be from a drip coffee maker, or from a coffee maker having a pump to circulate the flow of heated water.

Figure 23A:
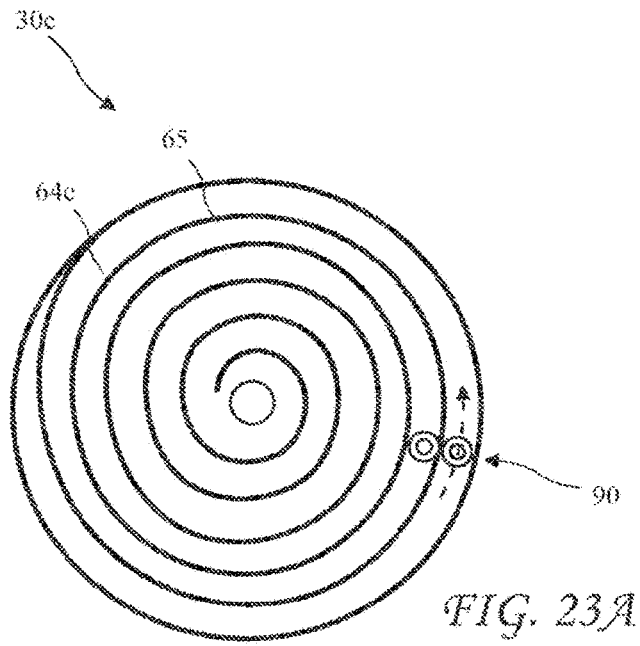
FIGS. 23A-23C show a third water dispersion assembly according to the present invention.
Figure 23B:
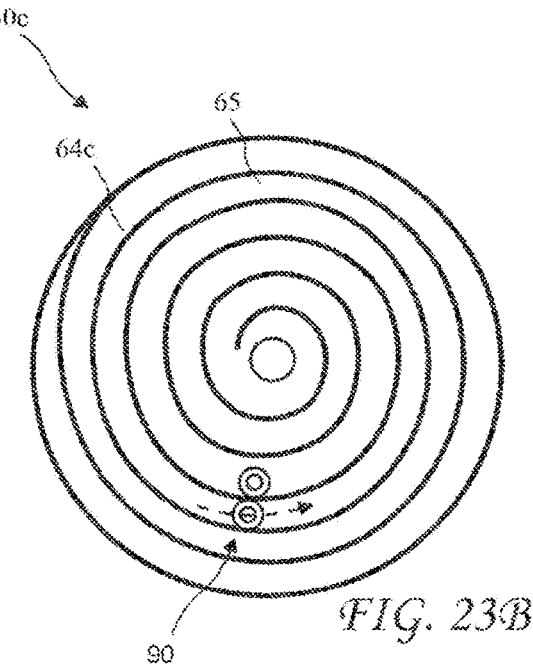
Figure 23C:
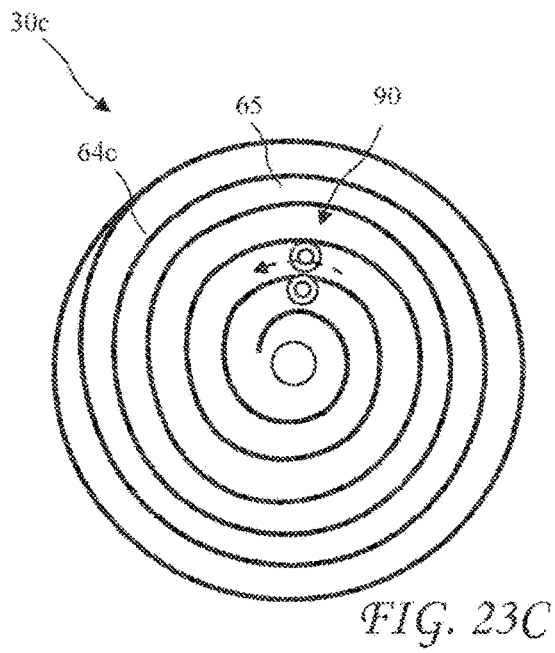

Motion of a third water dispersion assembly 30c is shown in FIGS. 23A-23C as a carrier 90 is shown traveling along a rail 92 of a third spiral guide 64c. A side view of the carrier 90 is shown in FIG. 24, a top view of the carrier 90 taken along line 25-25 of FIG. 24 is shown in FIG. 25, and a bottom view of the carrier 90 is shown in FIG. 26. The carrier 90 includes an idler roller 91a and driven roller 91b sandwiching an inverted "T" rail 92. The driver roller 91b is driven by a motor assembly 94 rotationally attached to the nozzle 74. The motor assembly 94 receives the third flow of heated water 36c and may be a water driven motor (see FIGS. 27 and 28) or be an electric motor 100 receiving electrical power through conductors 99 (see FIG. 29). The motor assembly 94 may be rotationally constrained by a water line carrying the third flow of heated water 36c to the motor assembly 94, or by a telescoping arm 94a, or be otherwise rotationally constrained to allow only some rotation of the motor assembly 94 as the carrier 90 travels along the spiral guide 30c.

A cross-sectional view of a water driven carrier 90 taken along line 27-27 of FIG. 26 is shown in FIG. 27, and a cross-sectional view of the water driven carrier 90 taken along line 28-28 of FIG. 27 is shown in FIG. 28. The water driven carrier 90 includes bearing 95a allowing a motor case 94' to pivot on the nozzle 74 and bearing 95a allowing the nozzle 74 to rotate in a guide plate 93 and to rotate the driven roller 91b. The idler roller 91a freely rotates on a vertical shaft fixed to the guide plate 93. The third flow of heated water 36c tangentially enters the motor case 94' through port 98 and cooperates with fins 96 attached to the nozzle 74 to rotate the nozzle 74 and thus also rotate the driven roller 91b causing the carrier 90 to travel along the rail 92. Ports 97 in the nozzle 74 receive the third flow of heated water 36c and the nozzle 74 releases the flow of heated water 37 (see FIG. 3) into the brewing material 28.

A cross-sectional view of a water driven carrier 90a having an offset nozzle 74a, taken along line 27-27 of FIG. 26, is shown in FIG. 27A. The offset nozzle 74a resides generally opposite to the port 98 and may provide a stronger flow of water out of the motor case 94'.

A cross-sectional view of an electric powered carrier 90 taken along line 27-27 of FIG. 26 is shown in FIG. 29. Electrical conductors 99 run parallel to the third flow of heated water 36c, and into the motor case 94' to an electric motor 100. The electric motor 100 is constrained from free rotation within the case 94' and rotates the nozzle 74 with respect to the case 94'. The electric powered carrier 90 is otherwise similar to the water powered carrier 90.

A toothed drive gear 91b' and toothed rail 92', of the third water dispersion assembly 30c, having engaging teeth are shown in FIG. 30. The teeth provide improved engagement of the drive gear 91b' and rail 92'.

A fourth water dispersion assembly 30d including an X-Y positioned nozzle is shown in FIG. 31. A first motor 100a positions a horizontal rail 104 on lateral rails 102, and a second motor 100b positions the nozzle 74 laterally on the horizontal rail 104. The motors 100a and 100b are microprocessor controlled to position the nozzle 74 to disburse the flow of heated water into brewing material.

A fifth water dispersion assembly 30e including an R theta positioned nozzle 74 is shown in FIG. 32. A telescoping arm 112 is motor driven to position the nozzle 74 radially and a pivot 110 is motor driven to position the nozzle 74 angularly. The telescoping arm 112 and pivot 110 are microprocessor controlled to position the nozzle 74 to disburse the flow of heated water into brewing material.

Figure 33B:
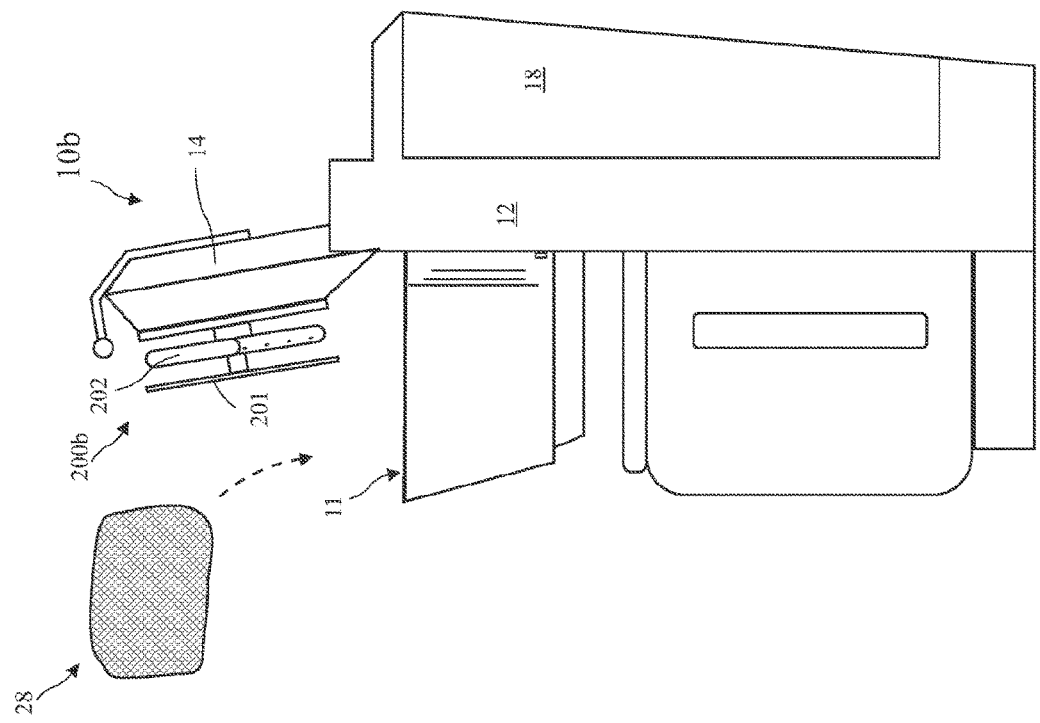
FIG. 33B shows a second coffee maker including a baffle under the water dispersing arms according to the present invention.
Figure 33A:
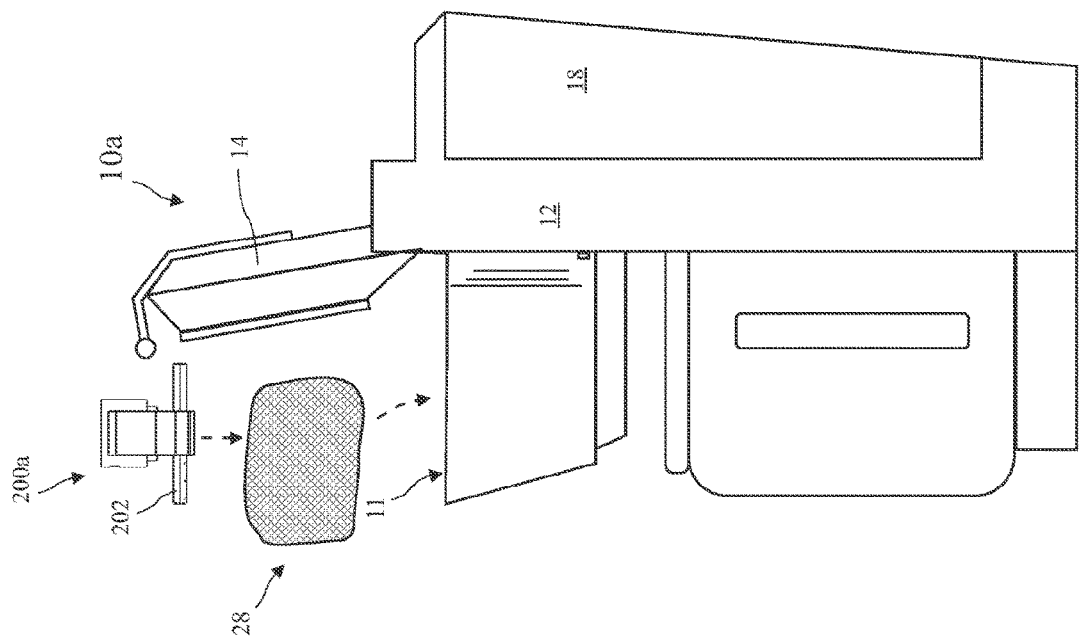
FIG. 33A shows a second coffee maker including water dispersing arms according to the present invention.

A coffee maker 10a according to the present invention and including a first water dispersing assembly 200a is shown in FIG. 33A. The water dispersing assembly 200a is attached over the brewing chamber 11 after the brewing material 28 is deposited into the brewing chamber 11. Arms 202 are attached to the water dispersing assembly 200a to disperse water into the brewing material 28 during brewing.

A second coffee maker 10b according to the present invention and including a water dispersing assembly 200b attached to the coffee maker lid 14 is shown in FIG. 33B. Arms 202 are attached to the water dispersing assembly 200b to disperse water into the brewing material 28 during brewing. The water dispersing assembly 200b may include a baffle 201 residing under the arms 202 to separate the arms 202 from the brewing material 28.

Figure 34A:
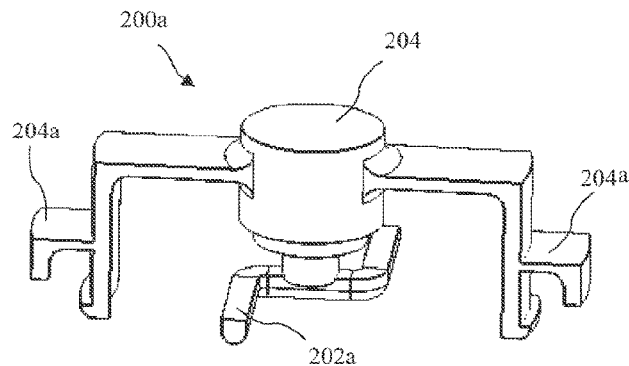
FIG. 34A shows an isometric view of a water dispersing assembly including the water dispersing arms according to the present invention.
Figure 34B:
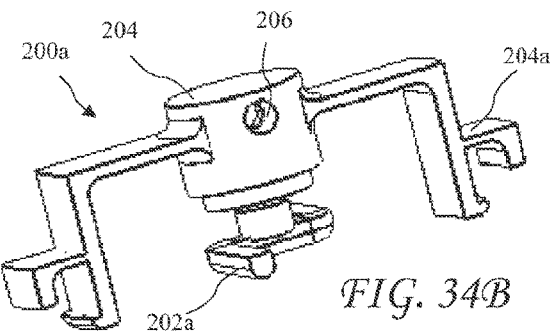
FIG. 34B shows a second isometric view of the water dispersing assembly including the water dispersing arms according to the present invention.
Figure 34C:
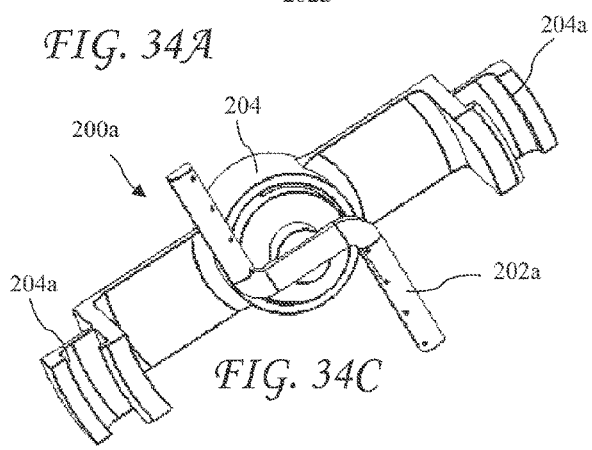
FIG. 34C shows a bottom isometric view of the water dispersing assembly including the water dispersing arms according to the present invention.

An isometric view of the water dispersing assembly 200a is shown in FIG. 34A, a second isometric view of the water dispersing assembly 200a is shown in FIG. 34B, and a bottom isometric view of the water dispersing assembly 200a is shown in FIG. 34C. The water dispersing assembly 200a includes an attachment bridge 204 for attaching the coffee maker 10 and water dispersing arms 202a. The attachment bridge 204 includes clips 204a to engage the coffee maker 10.

Figure 35A:
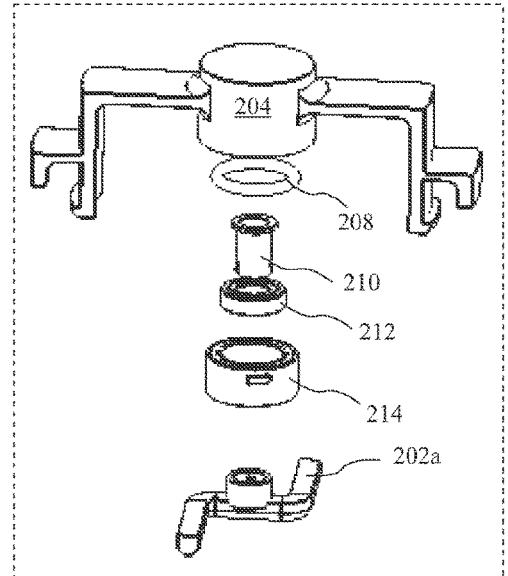
FIG. 35A shows a first exploded view of the water dispersing assembly including the water dispersing arms according to the present invention.
Figure 35B:
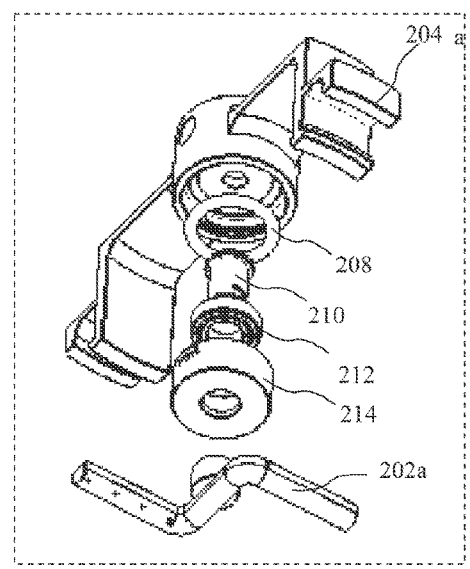
FIG. 35B shows a second exploded view of the water dispersing assembly including the water dispersing arms according to the present invention.

FIG. 35A shows a first exploded view of the water dispersing assembly 200a and FIG. 35B shows a second exploded view of the water dispersing assembly 200a. The water dispersing assembly 200a includes the attachment bridge 204, an O-ring 208, a locking shaft 210, a sealed bearing 212, a bearing connector 214, and the water dispersing arms 202a. The bearing connector 214 includes external tabs 214' which engage internal slots 204' in the attachment bridge 204, and the water dispersing arms 202a include internal tabs 202' which engage external slots 210' in the locking shaft 210, to assemble the water dispersing assembly 200a. The tabs and slots allow the water dispersing assembly 200a to be easily disassembled for cleaning.

Figure 37:
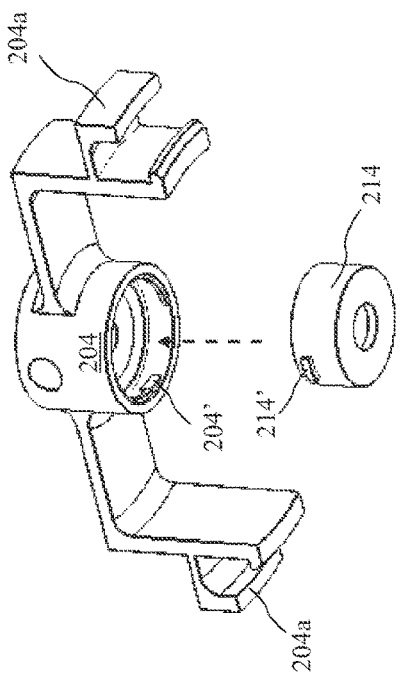
FIG. 37 shows engaging features of an attachment bridge and bearing connector according to the present invention.
Figure 38:
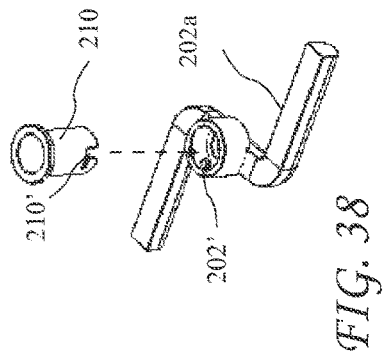
FIG. 38 shows engaging features of the water dispensing arms and a locking shaft according to the present invention.
Figure 36:
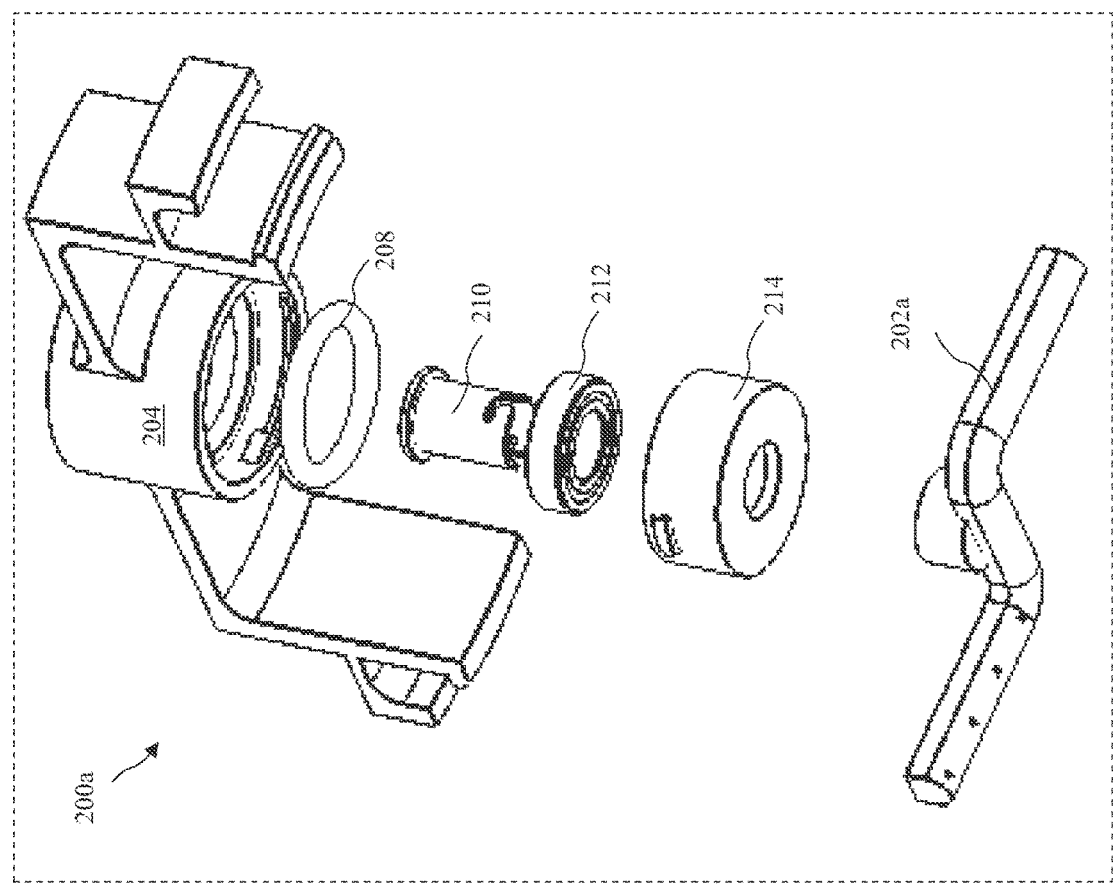
FIG. 36 shows a more detailed exploded view of the water dispersing assembly including the water dispersing arms according to the present invention.

A more detailed exploded view of the water dispersing assembly 200a is shown in FIG. 36, engaging clips 204a of the attachment bridge 204 and bearing connector 214 are shown in FIG. 37, and engaging features of the water dispensing arms 202a and the locking shaft are shown in FIG. 38.

Figure 39C:
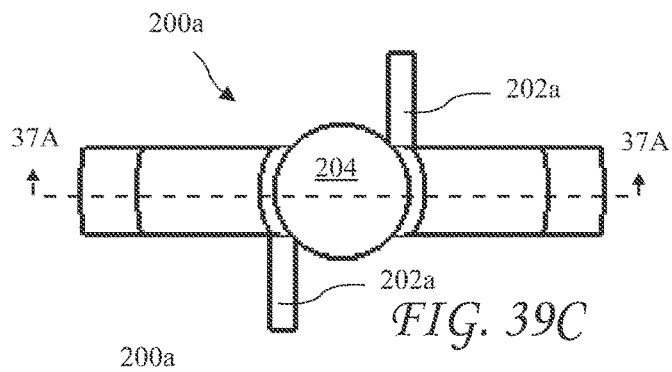
FIG. 39C shows a top view of the water dispersing assembly including the water dispersing arms according to the present invention.
Figure 39A:
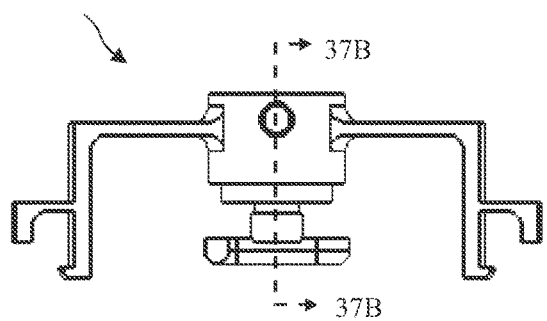
FIG. 39A shows a side view of the water dispersing assembly including the water dispersing arms according to the present invention.
Figure 39B:
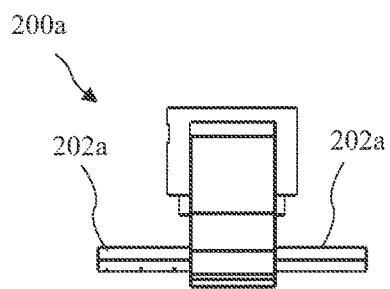
FIG. 39B shows an end view of the water dispersing assembly including the water dispersing arms according to the present invention.
Figure 39D:
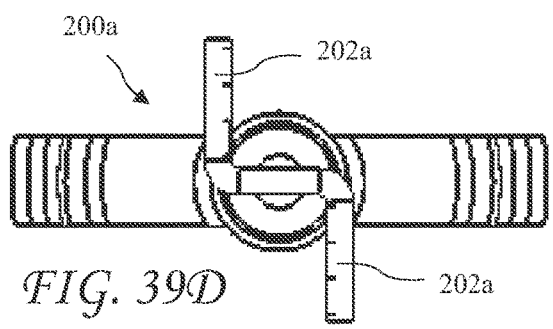
FIG. 39D shows a bottom view of the water dispersing assembly including the water dispersing arms according to the present invention.
Figure 40A:
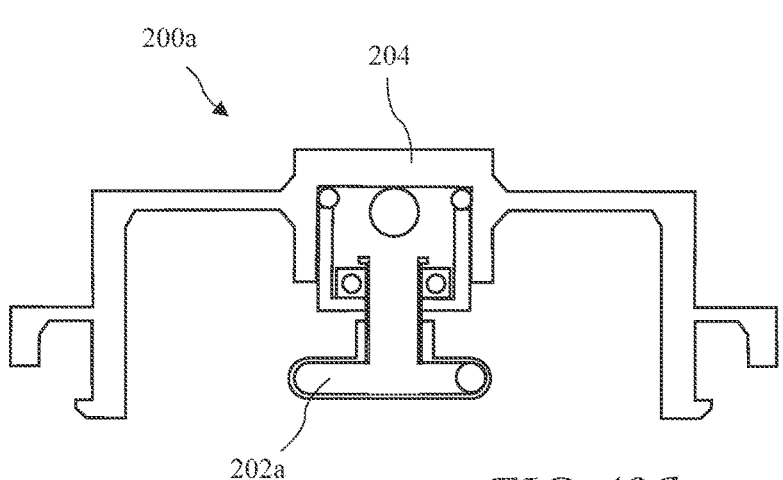
FIG. 40A shows a cross-sectional side view of the water dispersing assembly including the water dispersing arms according to the present invention taken along line 37A-37A of FIG. 39C.
Figure 40B:
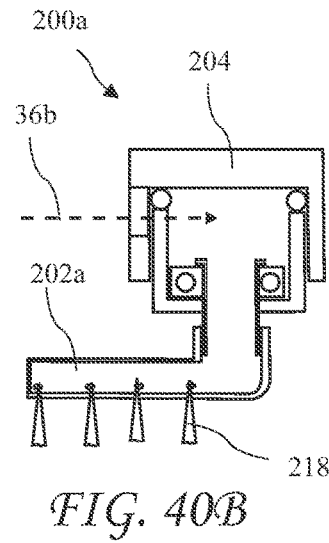
FIG. 40B shows a cross-sectional view of the water dispersing assembly including the water dispersing arms according to the present invention taken along line 37B-37B of FIG. 39A.

A side view of the water dispersing assembly 200a is shown in FIG. 39A, an end view of the water dispersing assembly 200a is shown in FIG. 39B, a top view of the water dispersing assembly 200a is shown in FIG. 39C, and a bottom view of the water dispersing assembly 200a is shown in FIG. 39D. A cross-sectional side view of the water dispersing assembly 200a taken along line 37A-37A of FIG. 39C is shown in FIG. 40A, and a cross-sectional view of the water dispersing assembly 200a taken along line 37B-37B of FIG. 39A is shown in FIG. 40B. The flow 36b from the heating element 34 is provided to the water dispersing assembly 200a and a spray pattern 218 from the water dispensing arms 202a result.

Figure 41A:
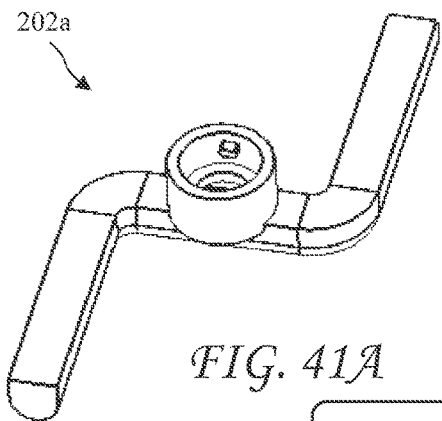
FIG. 41A shows a top isometric view of the water dispersing arms according to the present invention.
Figure 41B:
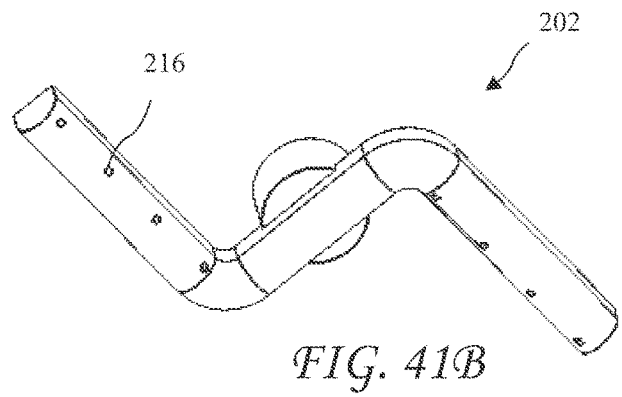
FIG. 41B shows a bottom isometric view of the water dispersing arms according to the present invention.
Figure 42C:
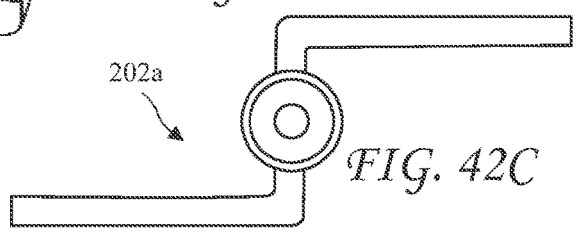
FIG. 42C shows a top view of the water dispersing arms according to the present invention.
Figure 42A:
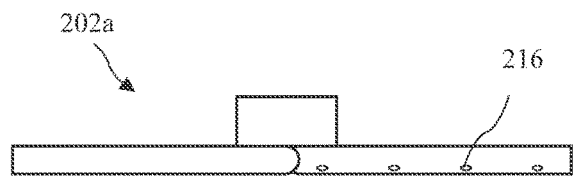
FIG. 42A shows a side view of the water dispersing arms according to the present invention.
Figure 42B:
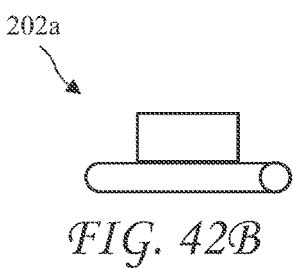
FIG. 42B shows an end view of the water dispersing arms according to the present invention.
Figure 42D:
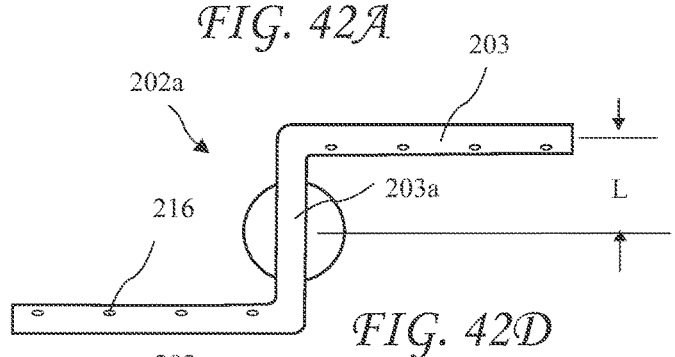
FIG. 42D shows a bottom view of the water dispersing arms according to the present invention.

A top isometric view of the water dispersing arms 202a is shown in FIG. 41A, a bottom isometric view of the water dispersing arms 202a is shown in FIG. 41B, a side view of the water dispersing arms 202a is shown in FIG. 42A, an end view of the water dispersing arms 202a is shown in FIG. 42B, a top view of the water dispersing arms 202a is shown in FIG. 42C, and a bottom view of the water dispersing arms 202a is shown in FIG. 42D. Right and left arms 203 of the water dispersing arms 202a are laterally (e.g., in the horizontal plane) offset by a center portion 203a a distance L.

Figure 43A:
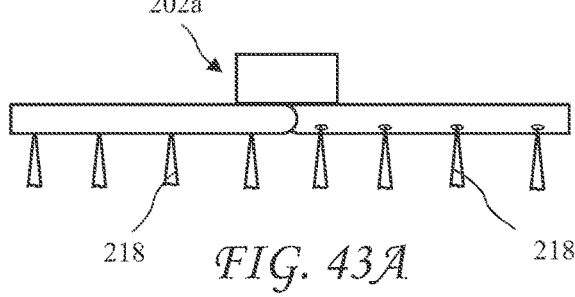
FIG. 43A shows a side view of the water dispersing arms and a spray pattern according to the present invention.
Figure 43B:
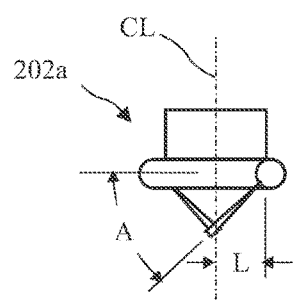
FIG. 43B shows an end view of the water dispersing arms and the spray pattern according to the present invention.

A side view of the water dispersing arms 202a and a spray pattern 218 is shown in FIG. 43A and an end view of the water dispersing arms and the spray pattern 218 is shown in FIG. 43B. The water dispersing arms 202a include ports 216 providing the spray pattern 218. The ports are angled an angle A from a vertical centerline CL of the water dispersing arms 202a. The angle A is preferably between 30 and 60 degrees, and is more preferably about 45 degrees. The angle A is selected to provide torque to rotate the water dispersing arms 202a during operation. The offset L is selected to direct the spray pattern 218 from both arms 203 to contact the brewing material along a generally straight line (see FIG. 43B). In the absence of the offset L, the contact of the two spray patterns from the two arm 203 would be displaced outwardly.

Figure 44A:
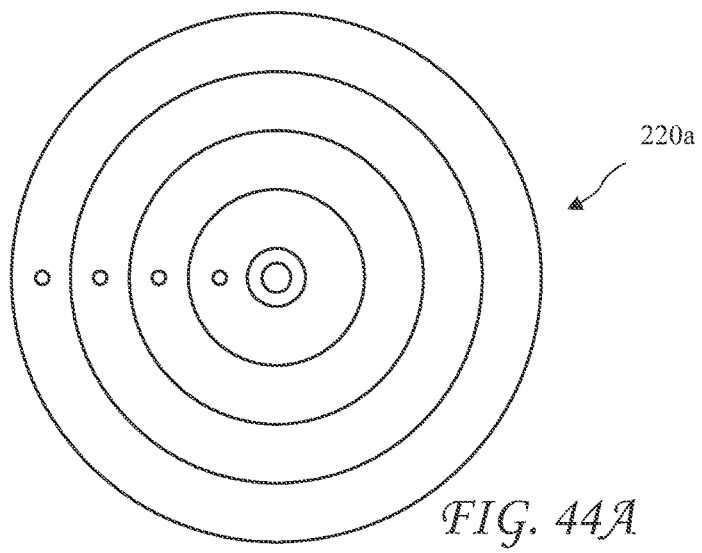
FIG. 44A shows a top view of water coverage provided by the water dispersing arms according to the present invention.
Figure 44B:
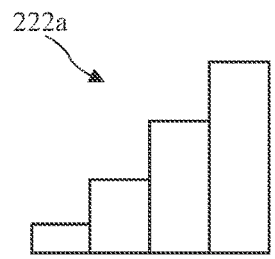
FIG. 44B shows a distribution of water coverage provided by the water dispersing arms according to the present invention.

A top view of water coverage provided by the water dispersing arms 202a is shown in FIG. 44A and a distribution of water coverage provided by the water dispersing arms 202a is shown in FIG. 44B. The spray pattern 218 provides the same amount of water to each ring, however, the outside ring has about eight times the area of the inside ring, and thus receives about one eighth the water per unit area.

Figure 45A:
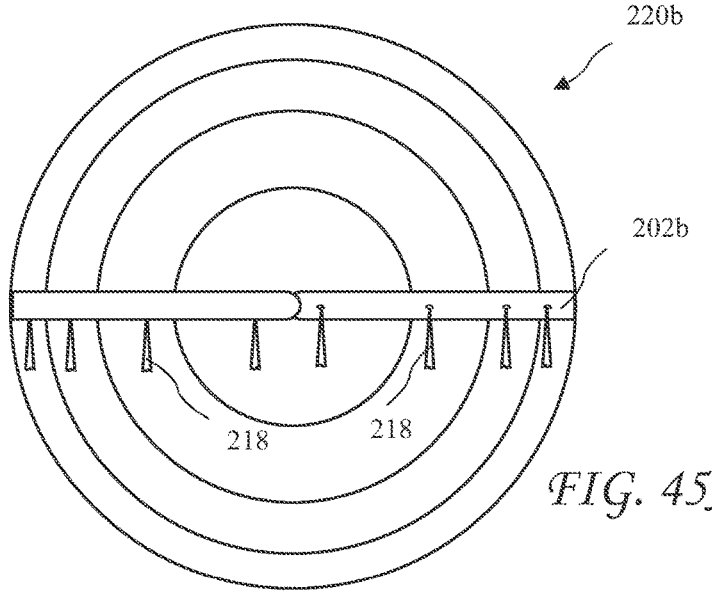
FIG. 45A shows a top view of water coverage provided by second water dispersing arms according to the present invention.
Figure 45B:
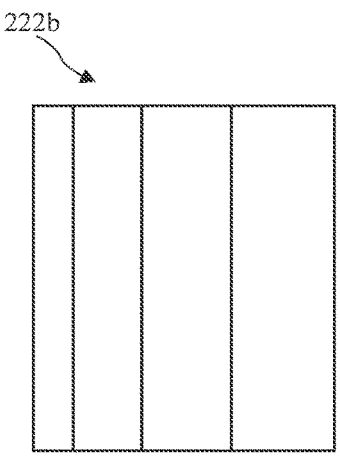
FIG. 45B shows a distribution of water coverage provided by the second water dispersing arms according to the present invention.

A top view of water coverage provided by second water dispersing arms 202b is shown in FIG. 45A and a distribution of water coverage provided by the second water dispersing arms 202b is shown in FIG. 45B. The spacing of the ports 216 is adjusted to provide about the same water per unit area to all of the rings.

Figure 46A:
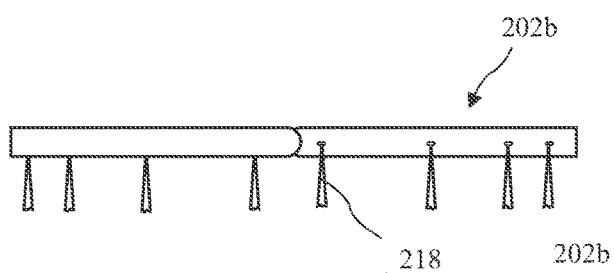
FIG. 46A shows a side view of the second water dispersing arms according to the present invention.
Figure 46B:
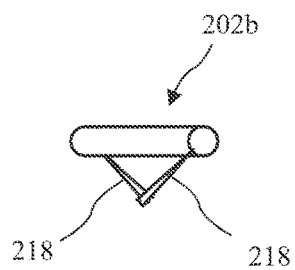
FIG. 46B shows an end view of the second water dispersing arms according to the present invention.
Figure 46C:
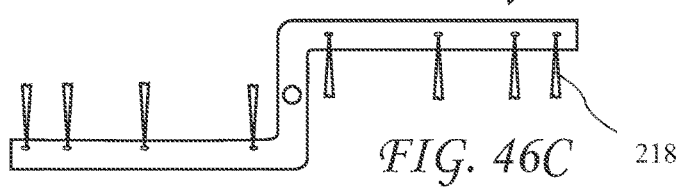
FIG. 46C shows a bottom view of the second water dispersing arms according to the present invention.

A side view of the second water dispersing arms 202b is shown in FIG. 46A, an end view of the second water dispersing arms 202b is shown in FIG. 46A, and a bottom view of the second water dispersing arms 202b is shown in FIG. 46C. The second water dispersing arms 202b are otherwise similar to the water dispersing arms 202a.

A third coffee maker 10b including an electric motor 224 to rotate third second water dispersing arms 202c is shown in FIG. 47, a side view of third water dispersing arms 202c is shown in FIG. 48A, a side view of third water dispersing arms 202c is shown in FIG. 48B, a side view of third water dispersing arms 202c is shown in FIG. 48C, and a side view of third water dispersing arms 202c is shown in FIG. 48D. The water dispersing arms 202c include center ports 216a aimed directly down. The ports 216a do not require angling because the ports 216a aim the spray pattern directly down.

An example of components of a non-drip coffee maker 10c are shown in FIG. 49. The components include the water tank 18, a second heater 34a. Unlike the drip coffee maker, the coffee maker 10b may include a mechanical pump 302 controlled by a processor 300. The processor 300 may control the pump 302 to provide pulses of water 36b for a water dispersion system including the piston assembly 40, or may provide either a pulsed or continuous stream of water to a water dispersing assembly 200a. The processor 300 may further control a solenoid 304 or similar device replacing the piston assembly 40 in embodiments including the piston assembly 40.

INDUSTRIAL APPLICABILITY

The present invention finds industrial applicability in the field of brewed beverage.

SCOPE OF THE INVENTION

While the invention herein disclosed has been described by means of specific embodiments and applications thereof, numerous modifications and variations could be made thereto by those skilled in the art without departing from the scope of the invention set forth in the claims.

I claim:

1. A beverage brewer, comprising:
a brewing material holder; and
a water-dispersing assembly disposed above the brewing material holder and configured to receive water;
wherein the water-dispersing assembly includes a movable water-dispersing member rotatably coupled above the brewing material holder, including an arm having a port, configured to release liquid from the water-dispersing assembly into the brewing material holder while rotating about an axis;
wherein the water-dispersing member includes a center portion;
wherein the at least one arm is a first arm, the water-dispersing member includes a second arm, and the first and second arms extend in opposite directions from the center portion; and
wherein each said arm has a plurality of ports angled away from a vertical centerline of the water-dispersing member, configured to produce a spray pattern of water having a horizontal component of sufficient force to create torque to rotate the water-dispersing member about the vertical centerline.

2. The beverage brewer of claim 1, wherein the water-dispersing assembly includes an electric motor configured to rotate the water-dispersing member.

3. The beverage brewer of claim 1, wherein the water-dispersing assembly includes an attachment bridge including clips configured to removably attach the water-dispersing assembly to the beverage brewer.

4. The beverage brewer of claim 1, wherein the ports are angled such that a force produced by water sprayed from the ports causes the water-dispersing member to rotate.

5. A beverage brewer, comprising:
a brewing material holder;
a water-dispersing assembly disposed above the brewing material holder and configured to receive water; and
a piston coupled to the water-dispersing member, configured such that a flow of the water through the water-dispersing assembly drives the piston to rotate the water-dispersing member;
wherein the water-dispersing assembly includes:
a movable water-dispersing member rotatably coupled above the brewing material holder; and
a water-dispersing manifold configured to receive the water and to rotate with the water-dispersing member;
wherein the water-dispersing manifold includes a plurality of ports configured to release the water into the brewing material holder as the water-dispersing member rotates.

6. A beverage brewer, comprising:
a brewing material holder;
a water-dispersing assembly disposed above the brewing material holder and configured to receive water; and
fins, configured such that a flow of the water through the water-dispersing assembly drives the fins to rotate the water-dispersing member;
wherein the water-dispersing assembly includes:
a movable water-dispersing member rotatably coupled above the brewing material holder; and
a water-dispersing manifold configured to receive the water and to rotate with the water-dispersing member;
wherein the water-dispersing manifold includes a plurality of ports configured to release the water into the brewing material holder as the water-dispersing member rotates.

7. The beverage brewer of claim 5, further comprising an electric motor configured to rotate the water-dispersing member.

8. The beverage brewer of claim 5, wherein the ports are uniformly spaced apart out from an axis of rotation of the water-dispersing manifold.

9. The beverage brewer of claim 5, wherein the ports are spaced apart at decreasing spacing away from an axis of rotation of the water-dispersing manifold.

10. The beverage brewer of claim 5, wherein:
the water-dispersing manifold includes at least one arm extending from an axis of rotation of the water-dispersing manifold; and
the ports are spaced apart along a length of the at least one arm.

11. The beverage brewer of claim 5, further comprising a lid, wherein the water-dispersing assembly is configured to be attached to the lid.

12. A beverage brewer, comprising:
a container configured to hold liquid;
a brewing material holder;
a liquid-dispersing assembly disposed above the brewing material holder and arranged in fluid communication with the container,
wherein the liquid-dispersing assembly includes a liquid-dispersing member rotatably coupled above the brewing material holder and arranged in fluid communication with the container, and
wherein the liquid-dispersing member includes at least one hollow arm having ports configured to issue liquid from the container into the brewing material holder;
a piston assembly arranged in fluid communication with the liquid-dispersing assembly and including a reciprocating rod; and
a check valve disposed in a fluid path between the container and the piston assembly, configured to prevent a reverse flow of liquid to the container and to provide a pulsating flow of liquid to the piston assembly;
wherein the reciprocating rod is configured to engage the liquid-dispersing assembly in response to the pulsating flow, thereby causing rotation of the liquid-dispersing member.

13. A beverage brewer, comprising:
a container configured to hold liquid;
a brewing material holder; and
a liquid-dispersing assembly disposed above the brewing material holder and arranged in fluid communication with the container;
wherein the liquid-dispersing assembly includes a liquid-dispersing member rotatably coupled above the brewing material holder and arranged in fluid communication with the container;
wherein the liquid-dispersing member includes at least one hollow arm having arm ports configured to issue liquid from the container into the brewing material holder; and
wherein the liquid-dispersing member includes a nozzle having a nozzle port configured to move in a spiral pattern above the brewing material holder.

14. The beverage brewer of claim 13, further comprising a distribution disk and a spiral guide, wherein:
the nozzle is configured to move radially within the distribution disk,
the distribution disk is configured to rotate with the radial movement of the nozzle, and
the spiral guide is configured to provide the spiral pattern in response to the rotation of the distribution disk.

15. The beverage brewer of claim 14, wherein:
the spiral guide includes a spiral groove;
the nozzle engages the spiral groove;
the spiral guide is biased toward the nozzle to maintain engagement of the nozzle with the spiral groove;
the spiral groove varies in depth from a deeper first end to a shallower second end;
the nozzle moves from the first end to the second end as the distribution disk rotates; and
the nozzle is biased toward the first end such that the nozzle is returned to the first end when it reaches the second end.

16. A beverage brewer, comprising:
a container configured to hold liquid;
a brewing material holder;
a liquid-dispersing assembly disposed above the brewing material holder and arranged in fluid communication with the container; and
a rotatable distribution disk;
wherein the liquid-dispersing assembly includes a liquid-dispersing member rotatably coupled above the brewing material holder and arranged in fluid communication with the container, wherein the liquid-dispersing member includes at least one hollow arm having ports configured to issue liquid from the container into the brewing material holder;

wherein the liquid-dispersing assembly includes a nozzle disposed above the distribution disk;

wherein the distribution disk includes a plurality of concentric troughs and a corresponding plurality of concentric through-holes, wherein one said through-hole is arranged in a respective one of each said trough; and wherein each said through-hole is arranged for fluid communication with the brewing material holder.

17. The beverage brewer of claim 16, further comprising:
a pivot arm, to which the nozzle is attached; and
a spiral guide configured to guide the pivot arm to align the nozzle with each said trough in sequence.

18. The beverage brewer of claim 17, wherein:
the spiral guide includes a spiral groove;
the nozzle engages the spiral groove;
the spiral guide is biased toward the nozzle to maintain engagement of the nozzle with the spiral groove;
the spiral groove varies in depth from a deeper first end to a shallower second end;
the nozzle moves from the first end to the second end as the distribution disk rotates; and
the pivot arm is biased toward the first end such that the nozzle is returned to the first end when it reaches the second end.

19. The beverage brewer of claim 6, further comprising an electric motor configured to rotate the water-dispersing member.

20. The beverage brewer of claim 6, wherein the ports are uniformly spaced apart out from an axis of rotation of the water-dispersing manifold.

21. The beverage brewer of claim 6, wherein the ports are spaced apart at decreasing spacing away from an axis of rotation of the water-dispersing manifold.

22. The beverage brewer of claim 6, wherein:
the water-dispersing manifold includes at least one arm extending from an axis of rotation of the water-dispersing manifold; and
the ports are spaced apart along a length of the at least one arm.

23. The beverage brewer of claim 6, further comprising a lid, wherein the water-dispersing assembly is configured to be attached to the lid.

* * * * *